Jan. 9, 1968  A. S. COOPER  3,362,066
ELECTRICAL CORE MANUFACTURE
Original Filed April 24, 1962  11 Sheets-Sheet 1
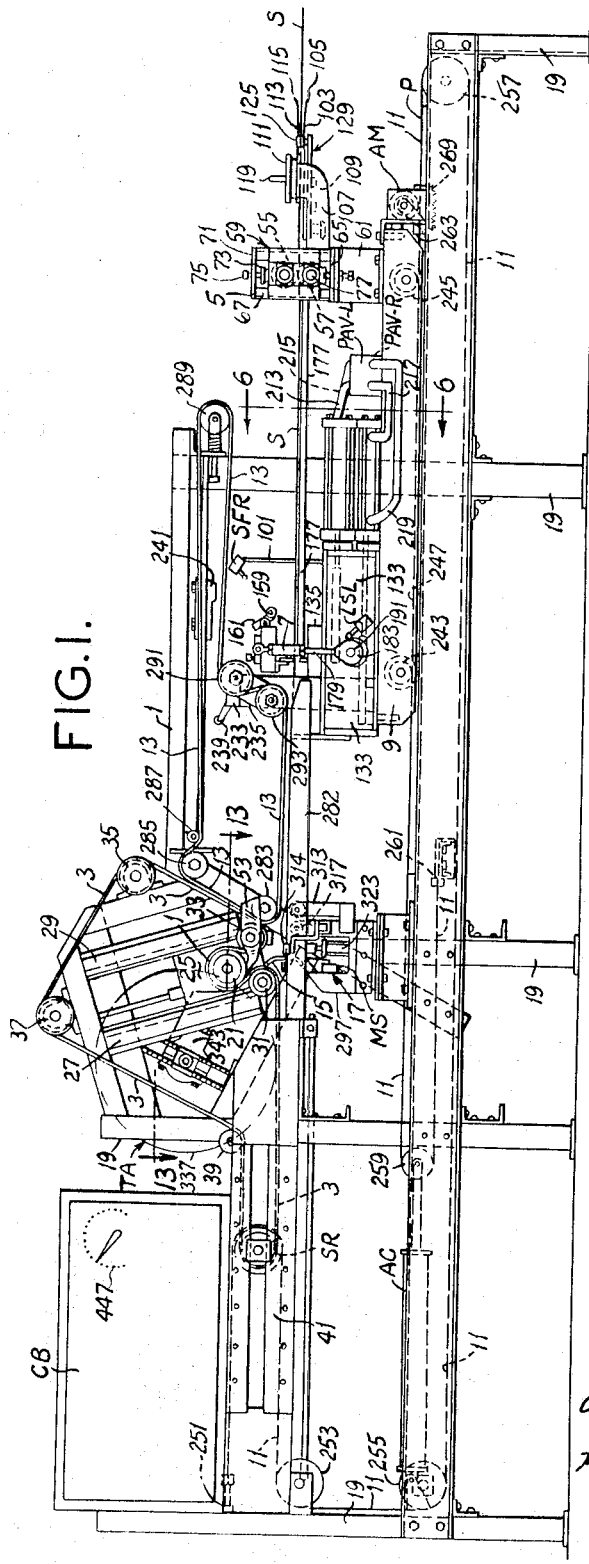
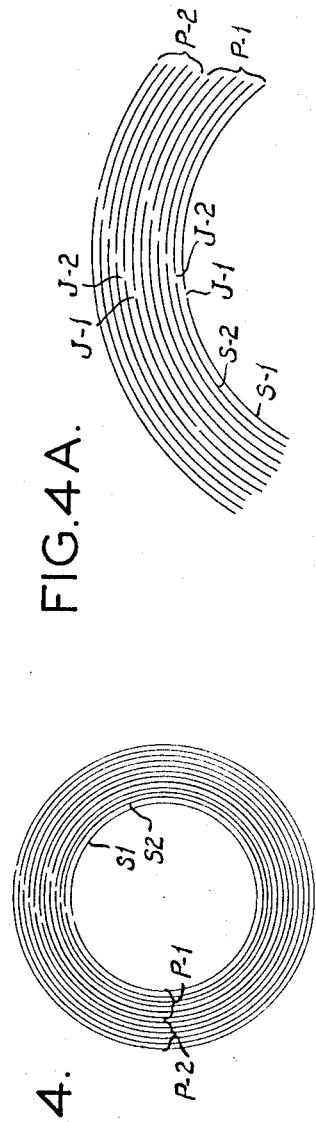
Alfred S. Cooper,
Inventor.
Koenig, Senniger,
Powers and Leavitt.
Attorneys.

Jan. 9, 1968  A. S. COOPER  3,362,066
ELECTRICAL CORE MANUFACTURE
Original Filed April 24, 1962  11 Sheets-Sheet 2
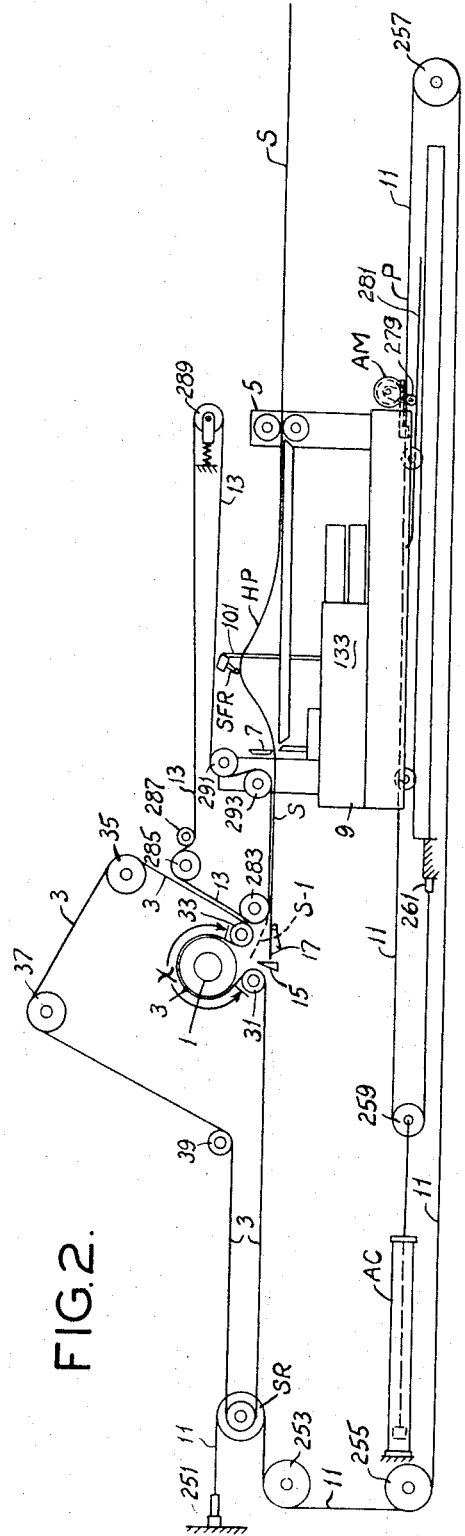
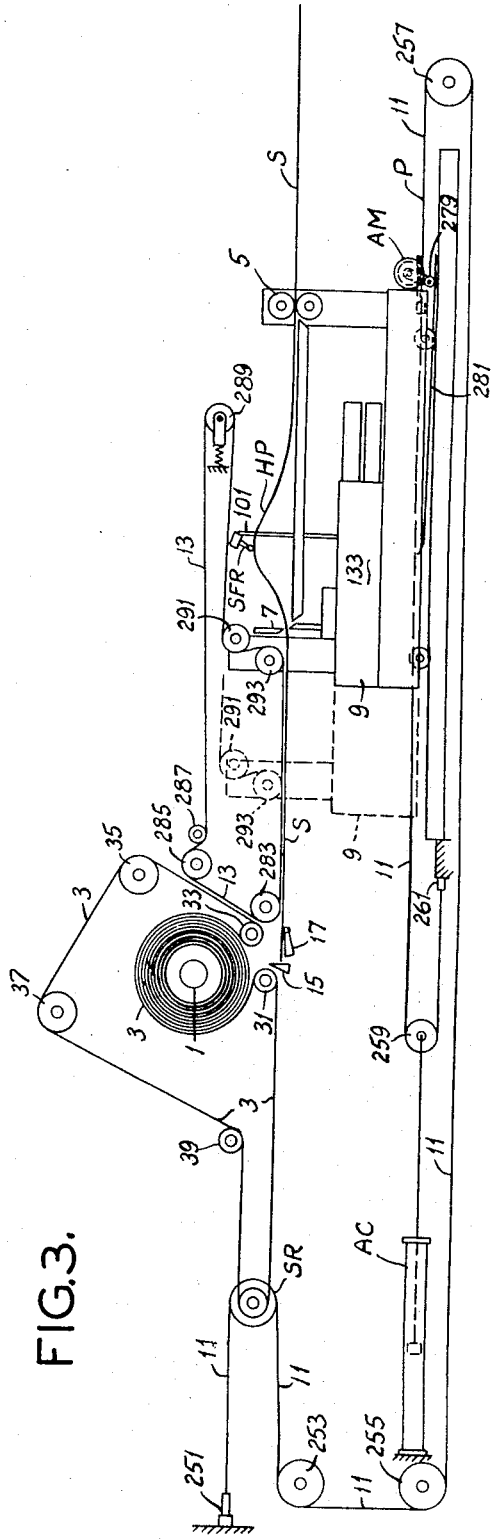

Jan. 9, 1968   A. S. COOPER   3,362,066
ELECTRICAL CORE MANUFACTURE
Original Filed April 24, 1962   11 Sheets-Sheet 3

Jan. 9, 1968  A. S. COOPER  3,362,066
ELECTRICAL CORE MANUFACTURE
Original Filed April 24, 1962  11 Sheets-Sheet 4

Jan. 9, 1968

A. S. COOPER 3,362,066

ELECTRICAL CORE MANUFACTURE

Original Filed April 24, 1962

Jan. 9, 1968 A. S. COOPER 3,362,066
ELECTRICAL CORE MANUFACTURE
Original Filed April 24, 1962 11 Sheets-Sheet 6

Jan. 9, 1968  A. S. COOPER  3,362,066
ELECTRICAL CORE MANUFACTURE
Original Filed April 24, 1962  11 Sheets-Sheet 8

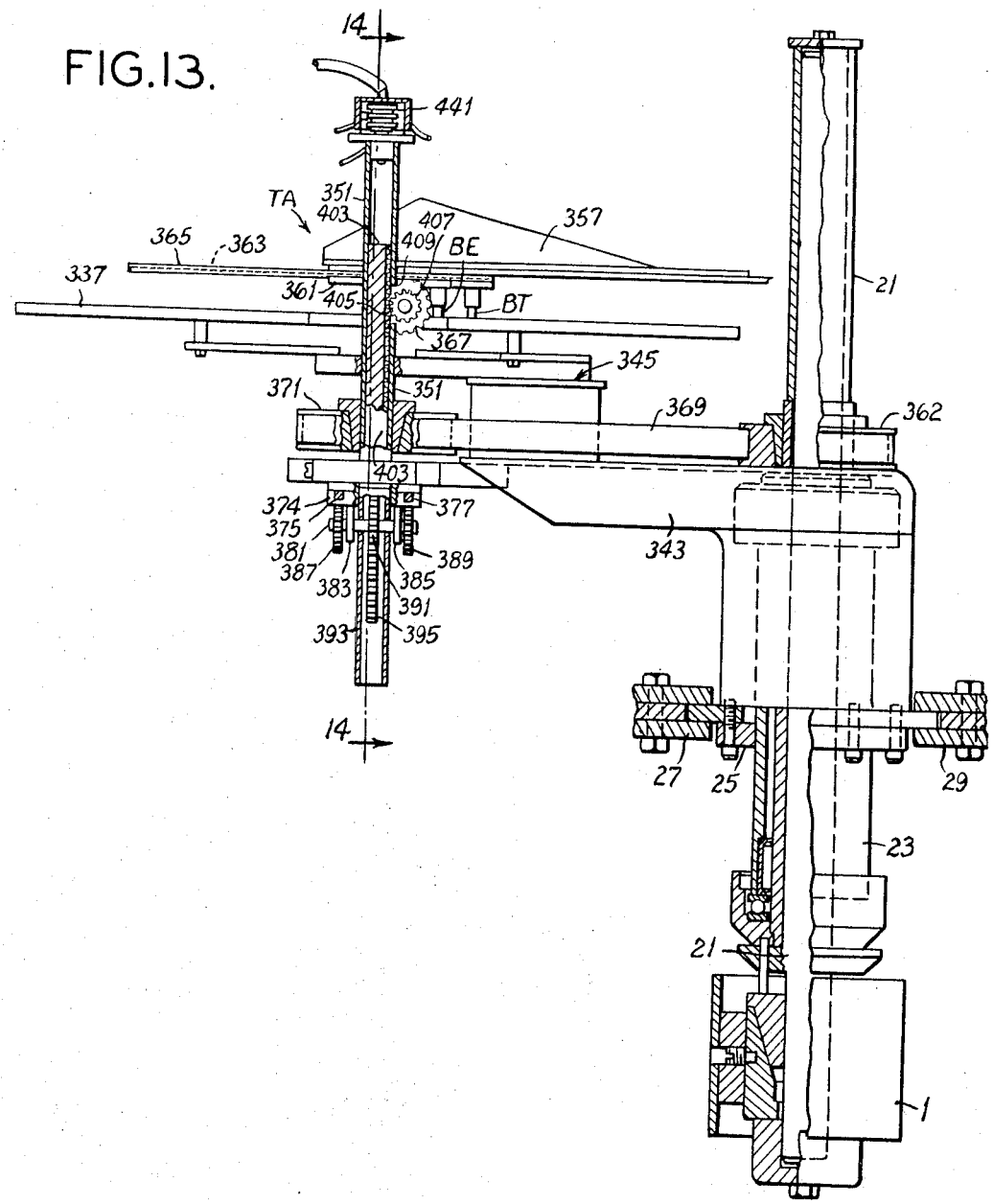

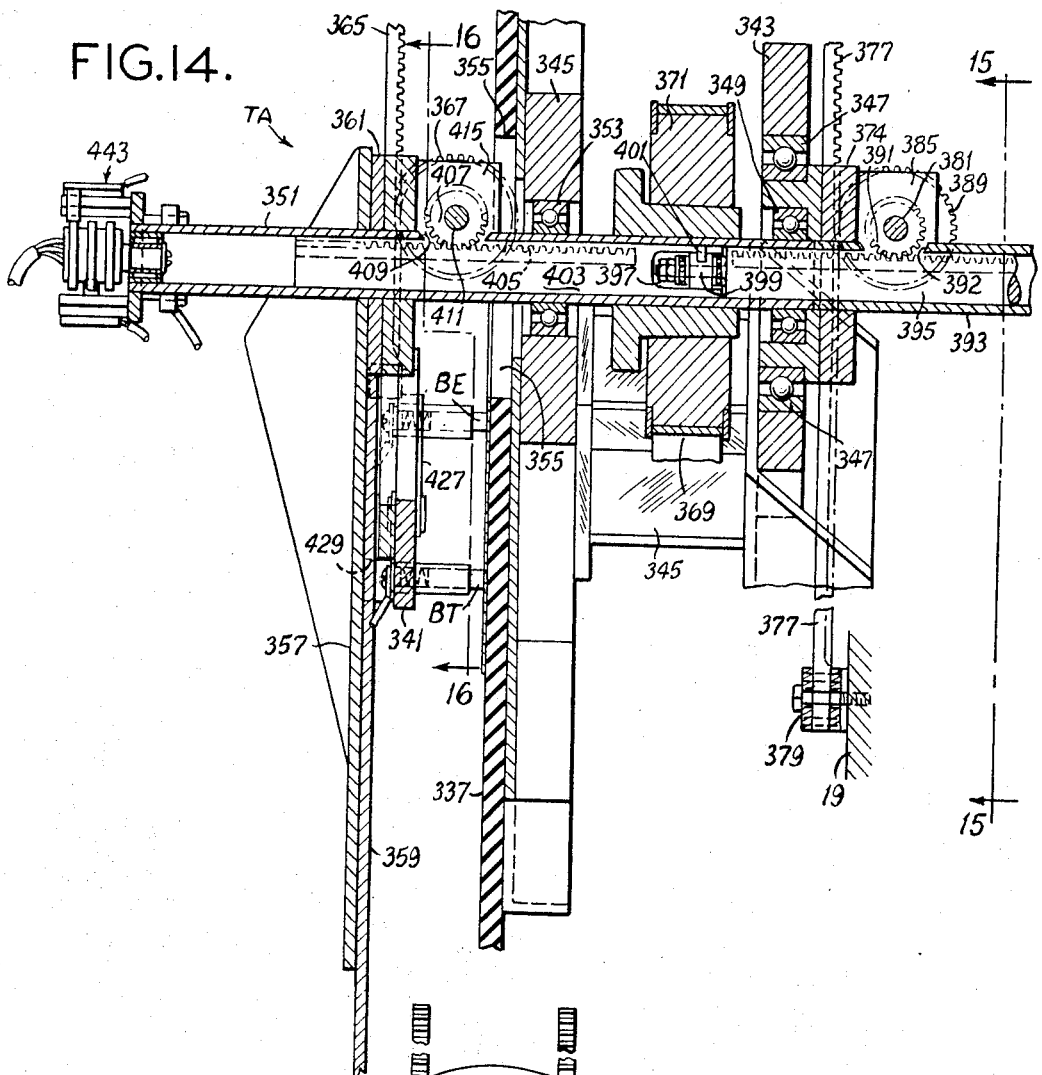
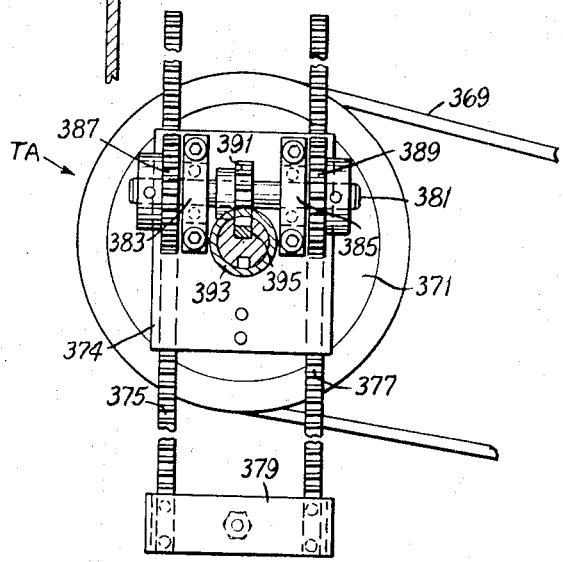

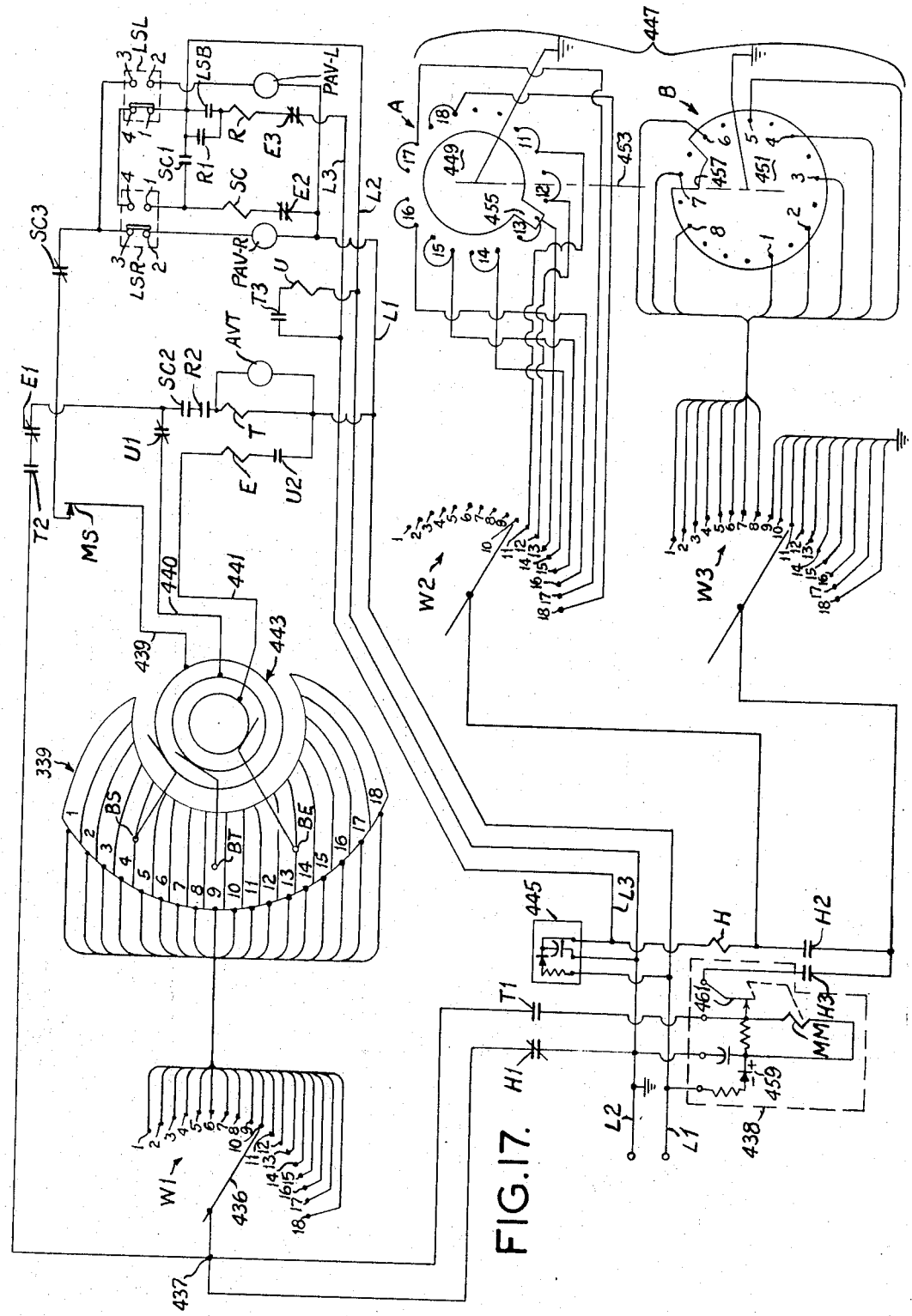

United States Patent Office 3,362,066
Patented Jan. 9, 1968

3,362,066
ELECTRICAL CORE MANUFACTURE
Alfred S. Cooper, Downsview, Ontario, Canada, assignor, by mesne assignments, to Central Transformer Corporation, Pine Bluff, Ark., a corporation of Arkansas
Original application Apr. 24, 1962, Ser. No. 189,800, now Patent No. 3,253,439, dated May 31, 1966. Divided and this application Oct. 1, 1965, Ser. No. 491,909
7 Claims. (Cl. 29—605)

This application is a division of my application Ser. No. 189,800, filed Apr. 24, 1962, now United States Patent 3,253,439, issued May 31, 1966, for Electrical Core Manufacture.

This invention relates to manufacturing magnetic core members for electrical induction apparatus, and more particularly to methods for manufacturing wound magnetic core loops.

Among the several objects of the invention may be noted the provision of improved methods for manufacturing wound magnetic core loops such as are used in transformers and the like, of the type having a series of strip segments with flux-transmitting joints and which, while being economical to manufacture, are low-loss loops and easy to assemble with preformed windings for forming transformers or the like; the provision of methods of the class described in which successively longer strip segments are automatically cut and wrapped to form magnetic core loops, the length of each strip-segment being determined by the increase in build or perimeter of the core as the latter is being formed; the provision of such methods which automatically compensate for variations in the thicknesses of the materials with which the core loops are manufactured; the provision of methods in which magnetic core loops of the type described are fabricated from a continuous strip of magnetic material; and the provision of methods for economically manufacturing such core loops in which flux-transmitting joints are provided in the loop in the course of the winding operation, no operations subsequent to the winding operation being required to provide the joints. Other objects and features will be in part apparent and in part pointed out hereinafter.

The invention accordingly comprises the methods hereinafter described, the scope of the invention being indicated in the following claims.

In the accompanying drawings, in which one of various possible embodiments of the invention is illustrated, FIG. 1 is a front elevation of an apparatus (with parts removed) used in the practice of this invention;

FIGS. 2 and 3 are diagrammatic views illustrating two stages in the manufacture of a magnetic core loop by the methods of the present invention;

FIG. 4 is a view in elevation of one type of core loop which may be manufactured in accordance with this invention;

FIG. 4A is an enlarged fragmentary view of the core loop of FIG. 4 in elevation;

FIG. 13 is an enlarged partial section taken on line 13—13 of FIG. 1, with certain parts broken away and removed;

FIG. 14 is an enlarged partial section taken on line 14—14 of FIG. 13, with certain parts in a moved position;

FIG. 15 is a view in elevation of FIG. 14, looking from line 15—15 in FIG. 14, with parts removed;

FIG. 17 is a schematic diagram of the control circuit of the apparatus.

Corresponding reference characters indicate corresponding parts throuhgout the several views of the drawings.

Figure 5:
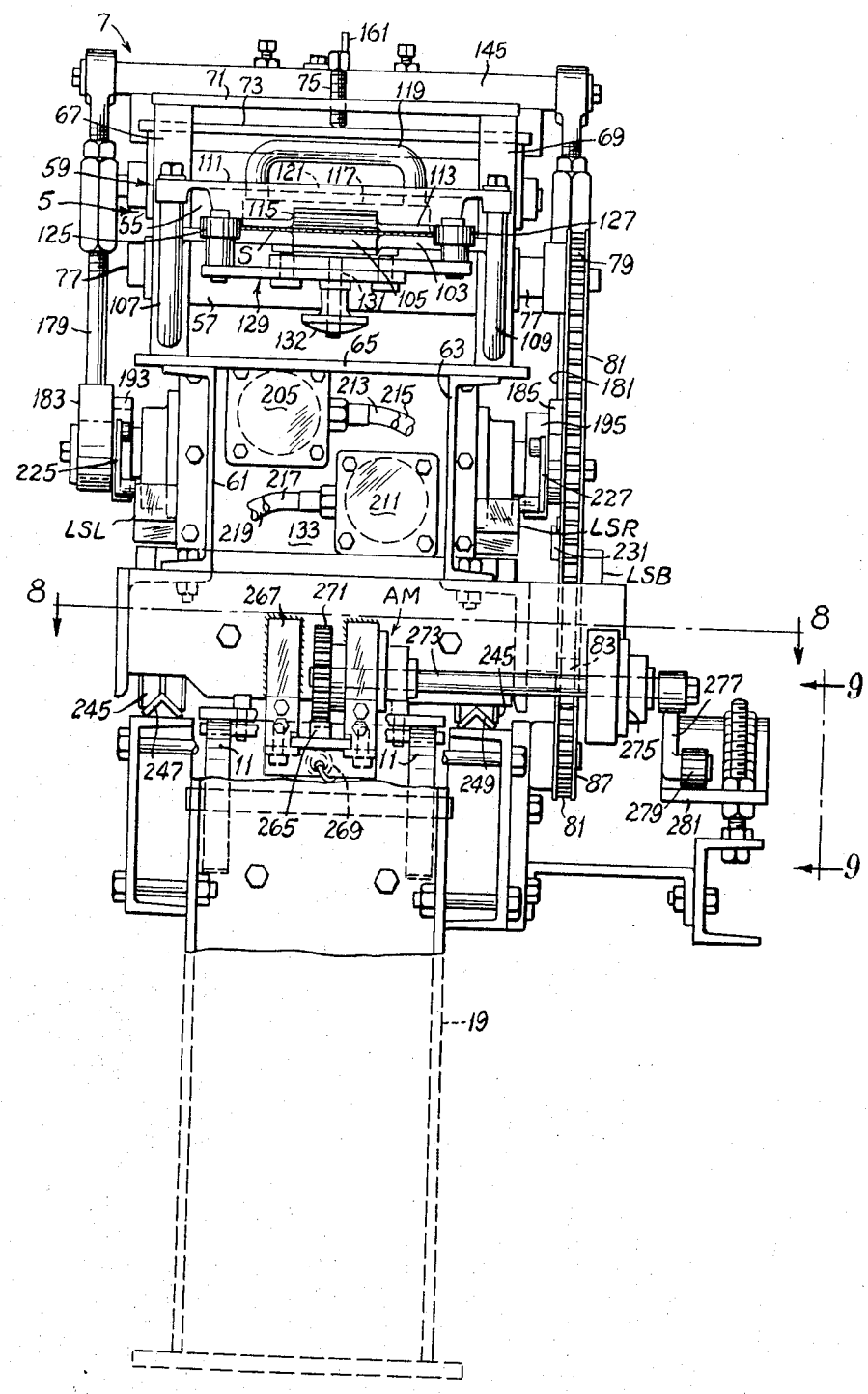
FIG. 5 is an enlarged end elevation of the apparatus looking from the right-hand end of FIG. 1, with parts removed.

The methods of this invention as described herein are particularly adapted for, although not limited to, the manufacture of magnetic core loops of the type shown in FIGS. 4 and 4A. These core loops comprise a plurality of individual segments S-1, S-2, etc., of magnetic material (such as grain-oriented silicon steel). The segments may, if desired, be grouped into packets such as indicated at P-1 and P-2. The ends of each segment of the core loop shown are butted or nearly butted against each other to form butt joints J-1, J-2, etc. The joints, such as J-1 and J-2, of the segments in each packet also may be offset from one another by a predetermined amount, such as five-eights of one inch for example. As will be discussed hereinafter, the number of segments in each packet and the number of packets in each core loop can be varied to produce a core loop of the desired construction and size. While the description and drawings of the apparatus are herein set forth with regard to the production of the type of core loop shown in FIG 4, it is to be understood that other types of core loops could be made by this method, such as core loops in which the flux-transmitting joints may be lap as well as butt type and in which the trailing ends of strip segments have a butt or lap joint relationship with the leading ends of respectively succeeding segments, and in which the joints may be radially aligned instead of respectively offset.

Referring to the drawings, FIG. 1 generally illustrates an apparatus for carrying out the methods of this invention and FIGS. 2 and 3 diagrammatically illustrate the operation of the apparatus. As shown in these figures, the apparatus generally comprises a core form 1, an endless wrapping belt 3 for rotating the core form, a strip feed roll assembly 5 and a quick-acting cutter or shear 7 mounted on a carriage 9, carriage moving tapes or bands 11, a strip segment hold-down and feed belt 13, a stop 15, a trip mechanism 17, timing apparatus TA (FIGS. 1 and 12-16) for controlling the operation of the shear 7 and trip mechanism 17, and an electrical control system (FIG. 17), a portion of which is mounted in a control box CB (FIG. 1). The core form 1 is shown as being of circular shape for winding circular core loops. Food roll assembly 5 is adapted to feed a continuous strip S of the magnetic metal through the shear 7 and toward the stop 15. The strip S is withdrawn from a coil (not shown in the drawings due to space limitations, but which would be off to the right of FIGS. 1, 2 and 3). The shear 7 is adapted to intermittently cut the strip S into individual segments, the leading ends of which segments are kicked upwardly toward the nip of the core form 1 and belt 3 by trip mechanism 17 at the proper time to obtain the desired offset between the joints of the segments. The carriage 9 and tapes 11 serve as means for moving the shear 7. The holddown and feed belt 13 feeds the segments into the nip of the core form 1 and wrapping belt 3. The core form 1 and belt 3 wind the segments one after another on the core form until a core loop of the desired number of segments and packets is produced.

The carriage 9 is mounted for linear separation (forward and rearward movement) from the core form 1 in respect to the path of travel of the strip S. Retrograde movement (movement of the carriage to the right as viewed in FIGS. 1, 2 and 3) is effected by bands 11 between each cutting operation of the shear 7 so that each segment is successively longer than the preceding segment. The purpose of cutting each segment successively longer than the preceding one is to take into account or compensate for the increase in core loop build, as will be explained more fully hereinafter.

To form a core of the type shown in FIG. 4, the carriage 9 is first moved to the position shown in FIG. 2, wherein the shear 7 is spaced from stop 15 by a distance equal to the circumference or perimeter of the core form 1. The feed roll assembly 5 is actuated to feed strip S toward stop 15. After the leading end of strip S engages stop 15, continued feeding of strip S causes a hump HP (FIG. 2) to be formed in the trailing portion of strip S between the shear 7 and feed roll assembly 5. When the crest of this hump moves upwardly a predetermined height, it actuates a switch SFR which in turn deactuates the feed roll assembly 5. During the dwell period of the strip S the shear 7 is then automatically actuated as will be subsequently described to cut the length of segment S–1 from strip S. As soon as strip segment S–1 is cut from strip S, the hump HP of the strip S collapses and flattens thereby causing the leading end of the strip to be moved under the trailing end of the segment S–1. As the hump HP collapses, switch SFR becomes deactuated thus re-energizing the feed roll assembly 5 which resumes feeding the leading end of strip S toward stop 15. Next, after the operation of shear 7, trip mechanism 17 is automatically actuated as will be described hereinafter to kick the leading end of segment S–1 upwardly toward the nip of the wrapping belt 3 and core form 1 as shown by the dotted line position of the leading end of the strip segment S–1 in FIG. 2. Feed belt 13 feeds segment S–1 into the nip and the segment is wound around the core form. Since the trailing end of segment S–1 overlies the leading end of the strip S, the feedbelt 13, in addition to feeding strip segment S–1, also exerts a pulling force on the strip thereby aiding the feed roll assembly 5 in moving the leading end of the strip towards stop 15.

The second strip segment S–2 (FIGS. 4 and 4A) to be cut and wrapped must have a length equal to the circumference of the first segment S–1 after the latter has been wrapped on core form 1, i.e., the second segment S–2 must have a length greater than the length of the first segment by an amount equal to the increase in circumference of the combined core form 1 and first segment S–1 wrapped therearound over the circumference of the core form alone. Stating it another way, the circumference of the segment S–1 (after it has been wrapped around core form 1) is greater than the circumference of the core form alone by an amount dependent on the thickness of strip S. This increase in circumference or perimeter, which is due to the increase in the build, i.e., the increase in the diameter, of the core loop being wound, is equal to $2\pi t$ when a circular core form is employed, where $t$ is the thickness of the strip S. The second segment must therefore have a length which is $2\pi t$ longer than the first segment. In order to cut the second segment to have such a length the shear 7, which is mounted on carriage 9, must be moved to the right as viewed in FIG. 2 by $2\pi t$. The movement of the shear 7 and carriage 9 is generally accomplished in the following manner:

As the first segment S–1 is wound on the core form 1, the length of the portion X (FIG. 2) of the endless belt 3 which engages the core form 1 and segment S–1 is increased due to the enlarged circumference of the core form 1 and segment S–1. The increase in length of portion X causes the length of the remaining portion of belt 3 to be decreased. This decrease causes a sliding roller assembly SR around which belt 3 is trained to be moved to the right as viewed in FIG. 2 and such movement of sliding roller SR causes carriage moving bands 11, which are also trained around sliding roller SR and operatively connected to carriage 9, to move the carriage 9 (and the locus of shear 7) to the right. Thus the wrapping belt, in addition to its wrapping or coiling function, forms part of a sensing means for sensing the increasing build and perimeter of the core loop as the latter is wound; the bands 11 form a part of the means operatively connecting the belt to the carriage; and the sliding roll assembly SR forms a part of the sensing means and a part of the connecting means. While the wrapping belt 3 and the rollers around which it is trained might be so arranged and be of such size that the movement of carriage 9 would be exactly $2\pi t$ between each shearing operation, the particular arrangement of belt 3 and its rollers as illustrated actually moves carriage 9 to the right by a distance slightly more than $2\pi t$ (due to the inherent change in the geometrical relationship between the core form 1 and the two wrapping belt rolls adjacent thereto) during the period between successive shearing operations. Accordingly, as will be described hereinafter, an adjusting mechanism AM (FIG. 2) connecting bands 11 to carriage 9 permits the carriage to be pulled to the right by $2\pi t$. Thus, when the shear 7 is automatically operated to cut the second segment S–2, such segment will be $2\pi t$ longer than the first segment S–1. The trip mechanism 17 will be automatically actuated to kick the leading end of the second segment upwardly at such a time that the desired offset between the joint J–1 (FIG. 4A) of the first segment and the joint J–2 of the second segment is attained.

The operation of the apparatus is continued in substantially the same manner for succeeding segments and the carriage 9 and shear 7 are slowly moved to the right as viewed in FIGS. 2 and 3 as the core loop is formed. When it is desired to provide additional packets, such as P–2, etc., of wrapped segments, the trip mechanism 17 is automatically controlled to kick the leading end of the first segment of a succeeding packet upwardly at the proper time necessary to locate the joint of such segment in the proper location. After a core loop of the desired size is obtained, the apparatus is stopped in a manner to be subsequently described to prevent further winding of segments. The core loop is then removed from the core form 1 either manually as subsequently described, or by an automatically operated apparatus not shown.

More particularly, the apparatus includes a supporting frame generally designated 19 (FIG. 1). A composite horizontal shaft 21 (FIGS. 1 and 13) is rotatably mounted in an elongate bearing 23 (FIG. 13) extending through a plate 25 (FIGS. 1 and 13). Plate 25 is adapted to slide freely in inclined guides 27, 29 attached to frame 19. The core form 1 is removably mounted on one end of shaft 21. Endless wrapping belt 3 (FIG. 1), which rotates core form 1, is trained around the core form, rolls 31, 33, 35, 37 and 39 (which are rotatably connected to frame 19) and tensioning or sliding roller SR which is mounted for horizontal sliding movement in a track 41. Roll 33 (FIG. 1) is driven by a motor M (FIG. 12) and a conventional speed changer 42 through an electrically operated clutch 43, a conventional speed-reducing apparatus 45, a belt 47, and a pulley 49 connected to the shaft 51 of roll 33. Thus, rotation of roll 33 causes the belt 3 to rotate core form 1. As the strip segments S–1, S–2, etc. are fed into the nip of the core form 1 and wrapping belt 3, the successive segments will be wrapped around the core form and the previously wrapped segments, thus increasing the build of the core loop. The axis of rotation of the core form 1, i.e., the axis of the core loop being wound, moves upwardly in response to the increasing radius of the core loop. A U-shaped restraining arm 53 (FIGS. 1 and 10) pivotally attached to the shaft 51 of roll 33 and biased toward core form 1 has cantilevered springs 54 (FIG. 10) which retain the leading end of each segment against the core form 1 or previously wrapped segments as each segment is wound. Sliding roll SR (FIG. 1) is biased away from the core form 1 by bands 11, thereby keeping tension on belt 3, but is drawn toward the core form as the core being wound increases in circumference. The belt 3 may be provided with transverse notches and rolls 31, 33, 35, 37, and SR may be provided with teeth adapted to fit within the notches to assure a positive driving relationship therebetween.

The strip feed roll assembly 5 (FIGS. 1 and 5) includes upper and lower feed rolls 55 and 57, respectively, rotatably mounted in a roll support assembly 59 attached to carriage 9. Assembly 59 (see FIG. 5) includes two side channels 61, 63, a plate 65 extending across the upper edges of channels 61, 63, a pair of legs 67, 69 extending upwardly from plate 65, and a bar 71 extending across the upper ends of legs 67, 69. Lower roll 57 is rotatably journalled in legs 67, 69 and upper roll 55 is rotatably journalled in an inverted U-shaped roll carrier 73 which is slidably mounted in legs 67, 69. Upper roll 55 is adapted to frictionally engage the upper surface of strip S. A bolt 75 extending through bar 71 and engaging the roll carrier 73 prevents upward movement of upper roll 55.

Figure 12:
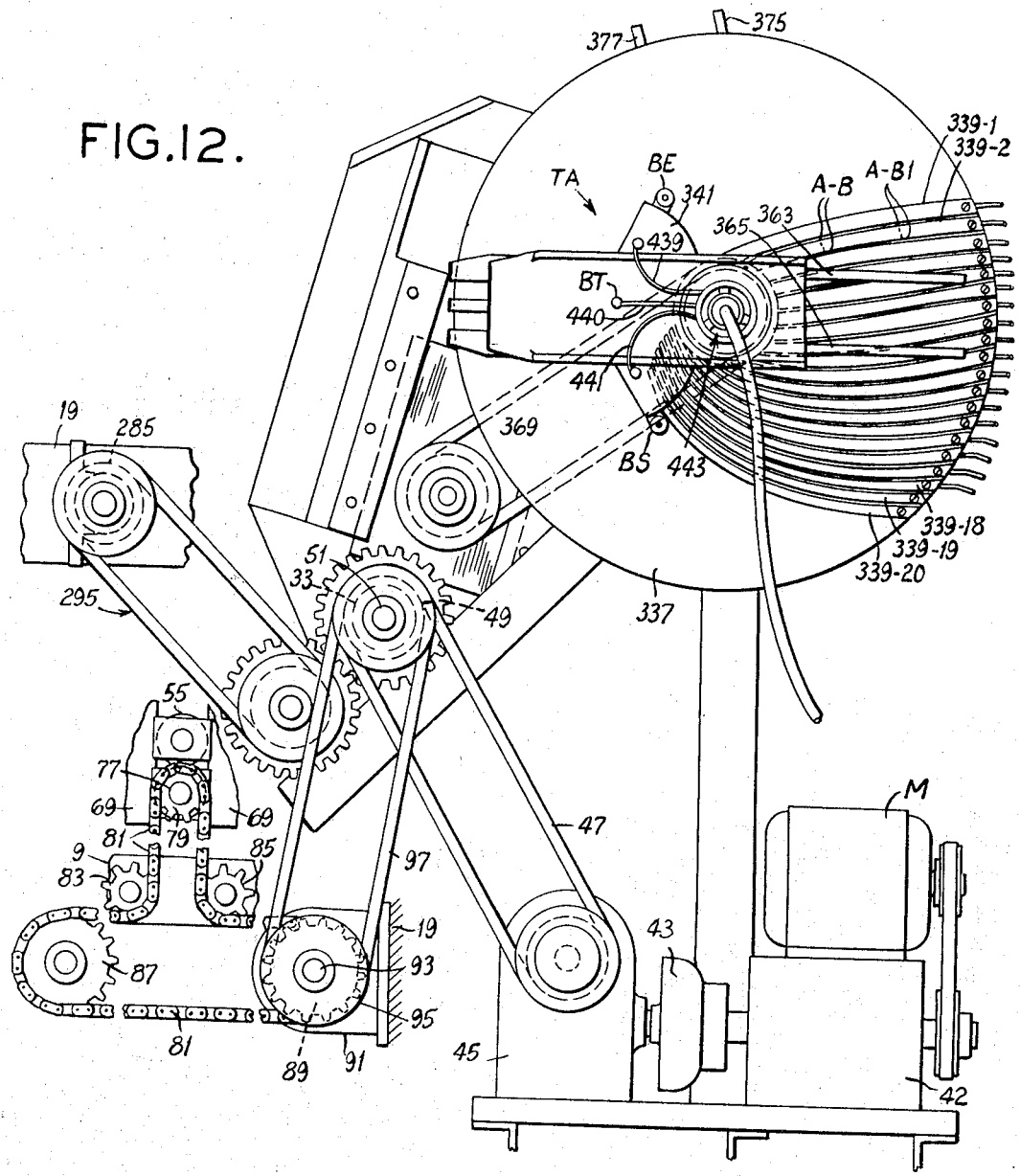
FIG. 12 is an enlarged rear elevation of a portion of the apparatus, with parts broken away and removed.

Referring to FIGS. 5 and 12 it will be seen that lower feed roll 57 has a shaft 77 which extends through the leg 69. A gear 79 is attached to the end of shaft 77. Gear 79 is driven by an endless chain 81 which passes around gear 79, a pair of idler gears 83, 85 located on carriage 9, a gear 87 located at one end of the supporting frame 19, and a gear 89 (FIG. 12) on the output shaft (not shown) of an electrically operated clutch and brake assembly 91. An input shaft 93 of the assembly 91 is provided with a pulley 95 which is driven from motor driven shaft 51 by a belt 97. It will be seen that the drive arrangement for the lower feed roll 57 is such that roll 57 will be driven even while the carriage 9 is moving as described hereinafter. Switch SFR, which controls the operation of feed rolls 55, 57, is mounted on a rod 101 (FIG. 1) extending upwardly from the carriage 9 between the feed roll assembly 5 and the shear 7. Switch SFR is actuated by the engagement and disengagement therewith of hump HP (FIG. 2) as described previously. The switch is adapted to control the operation of the clutch and brake assembly 91 (FIG. 12) which in turn controls the movement of the lower feed roll driving chain 81.

Feed roll assembly 5 also includes a lower guide and support plate 103 (FIGS. 1 and 5) on which strip S is adapted to be supported and guided into the nip of feed rolls 55 and 57. Plate 103 is attached to the legs 67, 69 and extends to the right of the legs as viewed in FIG. 1. The plate 103 is also narrowed and flared downwardly at its outer end as indicated at 105. A pair of arms 107, 109 (FIGS. 1 and 5) is attached to legs 67, 69. These arms extend to the right of legs 67, 69 as viewed in FIG. 1 and are joined at their outer ends by a cross bar 111 extending across and above plate 103. Attached to and extending to the right of cross bar 111 as viewed in FIG. 1 is an upper guide plate 113 having a narrowed and upwardly flared outer end 115 in vertical alignment with the flared end 105 of lower plate 103. A weight 117 (FIG. 5) is located below cross bar 111 and is held against horizontal movement by a handle 119 extending upwardly therefrom through a slot 121 (FIG. 5) in cross bar 111. Weight 117 is adapted to frictionally bear upon strip S as the fed rolls 55, 57 pull the strip from the supply to prevent whipping of the strip. A pair of side guide rollers 125, 127 (FIG. 5) is mounted on a scissors device 129 pivotally connected to the lower surface of lower plate 103 as indicated in FIG. 5 at 131. The rollers 125, 127 are adapted to engage the sides of the strip S and hold the strip in the proper lateral alignment for reception by the feed rolls. The guide rollers 125, 127 are also adapted to be clamped in different positions for guiding strips S having different widths by a clamping screw 132 (FIG. 5).

Figure 6:
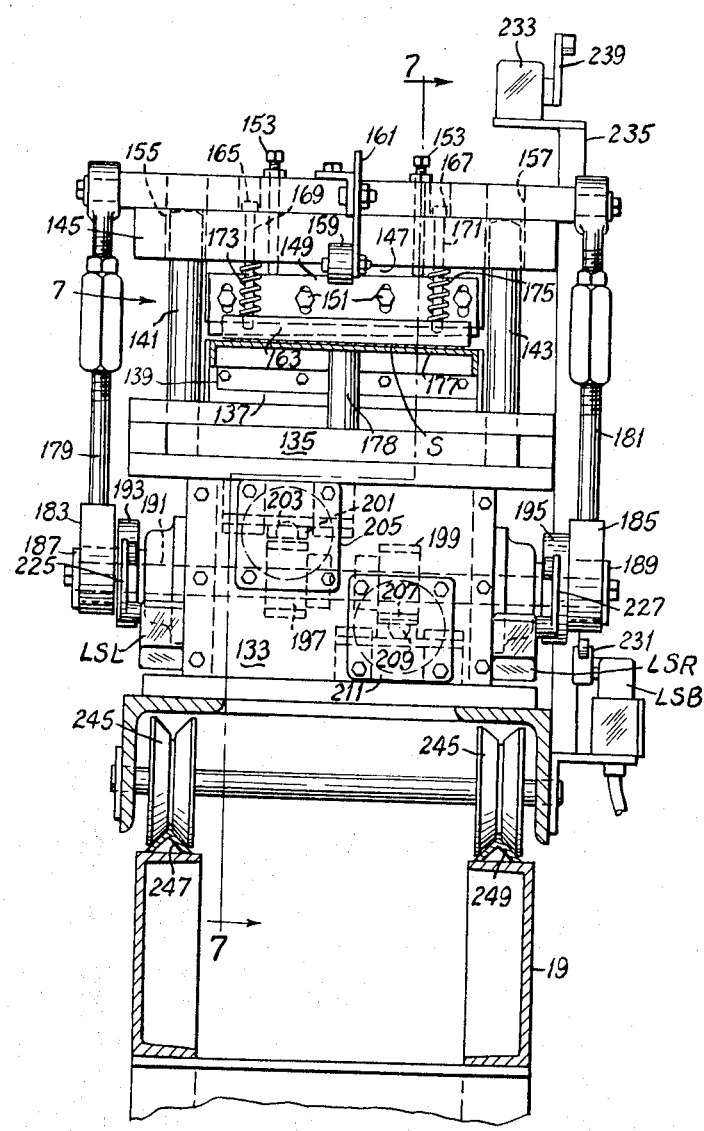
FIG. 6 is an enlarged section taken on line 6—6 of FIG. 1, with parts removed.

The quick-acting shear 7 (FIGS. 1, 5, 6 and 7) which cuts segments from strip S includes a housing 133 attached to carriage 9. Mounted on housing 133 is a horizontal shear bed plate 135 (FIG. 7), and mounted on the bed plate 135 is a blade holder 137 to which is secured a lower horizontal fixed transverse shear blade 139. Extending upwardly from opposite ends of bed plate 135 are vertical guide posts 141, 143 (FIG. 6). At 145 (FIGS. 6 and 7) is indicated a composite horizontal shear head plate. Mounted on the bottom of head plate 145 is a blade holder 147 to which is secured a transversely angled shear blade 149. The blade 149 is held in an angled position by horizontal bolts 151 and vertical bolts 153. The head plate 145 has vertical cylindrical guide holes 155, 157 at its ends through which posts 141, 143, respectively, pass.

A strip hold-down roller 159 (FIGS. 1, 6) is supported by an arm 161 connected to head plate 145 and extending to the right as viewed in FIG. 1. The purpose of this roller is to guide the strip so that the configuration of each of the humps HP will be such as to actuate switch SFR. A strip hold-down bar 163 (FIGS. 6 and 7) adapted to hold strip S down against the lower blade holder 137 as shearing is performed is slidably connected to the head plate 145 by bolts 165, 167 attached to bar 163 and slidably received within holes 169, 171, respectively, in head plate 145. Springs 173, 175 surround the respective bolts 165, 167 and bias the hold-down bar 163 away from head plate 145. A support bed 177 (FIGS. 1, 6 and 7) extends between the feed roll assembly 5 and the lower shear blade holder 137 for supporting the strip S therebetween. A post 178 (FIGS. 6 and 7) extends between shear bed plate 135 and the lower surface of bed 177 for supporting the bed 177.

Figure 7:
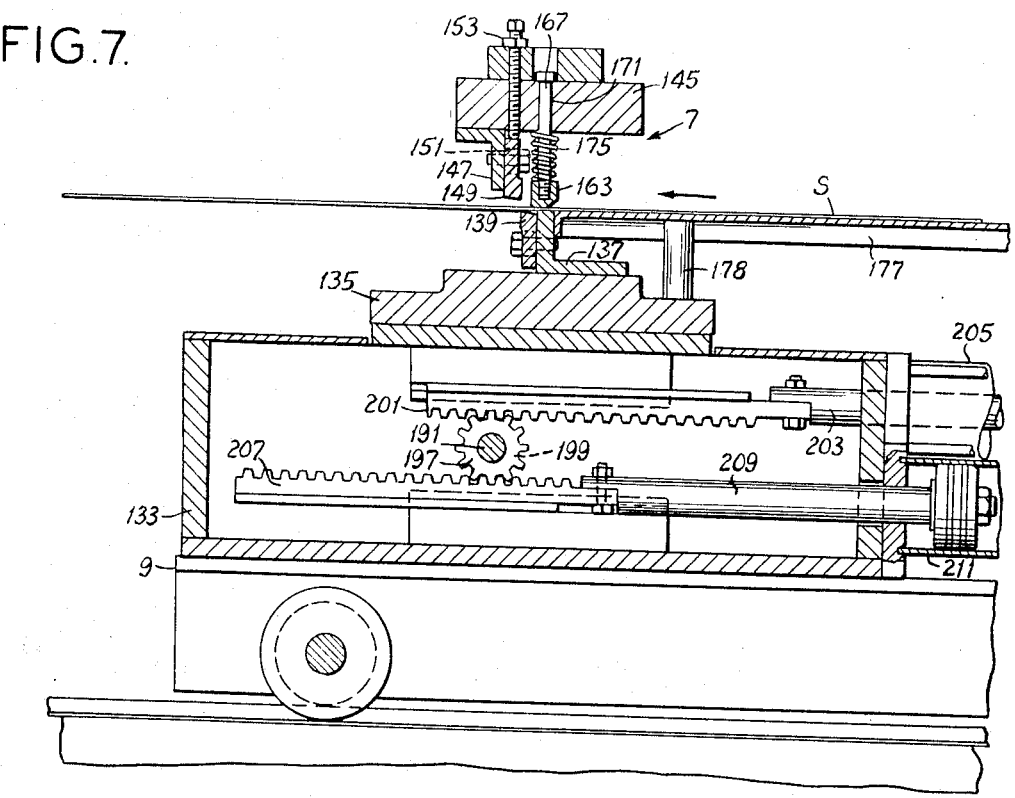
FIG. 7 is a fragmentary section taken on line 7—7 of FIG. 6, with some parts removed and other parts broken away.
Figure 8:
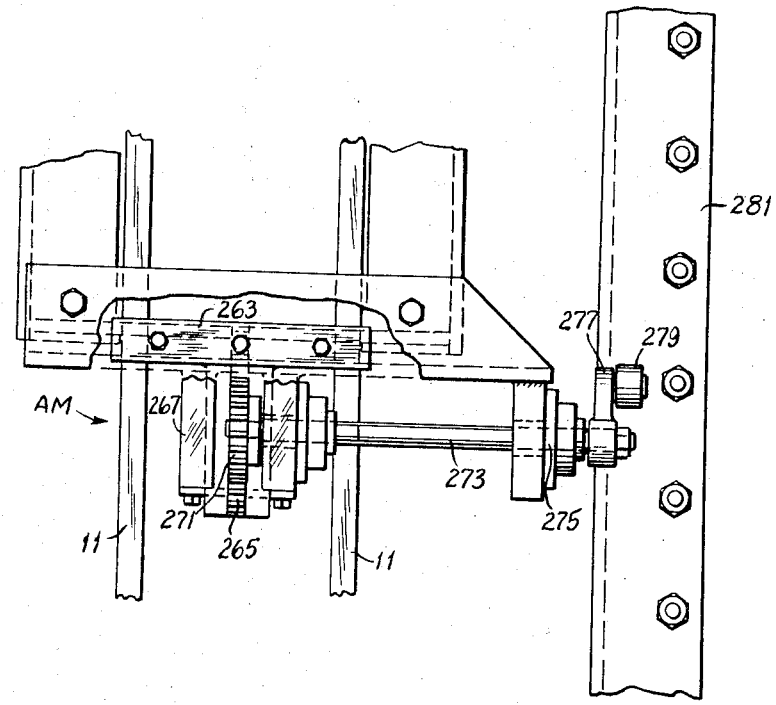
FIG. 8 is a plan view of a portion of the apparatus looking from line 8—8 of FIG. 5, with parts broken away.

The driving mechanism for moving the upper shear blade 149 downwardly to transversely cut strip S and upwardly to a retracted position includes two links 179, 181 (FIGS. 5 and 6) rotatably connected to the ends of head plate 145. The links 179, 181 are attached at their lower ends to yokes 183, 185, respectively. Yoke 183 has a bearing 187 (FIG. 6) and yoke 185 has a bearing 189, which bearings are eccentrically journalled on a shaft 191 which extends through housing 133. Mounted on shaft 191 between the bearings 187, 189 and housing 133 are two cams 193, 195 (FIG. 6), the construction and purpose of which will become apparent as hereinafter explained. Mounted on shaft 191 inside of housing 133 are two gears 197, 199 (see FIGS. 6 and 7) spaced apart from one another. Gear 197 is adapted to be driven by a rack 201 connected to a piston rod 203 of an air cylinder 205 (FIGS. 5, 6 and 7) and gear 199 is adapted to be driven by a rack 207 connected to a piston rod 209 of an air cylinder 211. Air is supplied to both ends of each of the cylinders 205, 211 through lines 213, 215 and 217, 219 (FIG. 5) connected to conventional air valves PAV-L and PAV-R (FIGS. 1 and 17) in such manner that, as seen in FIG. 7, for one shearing operation rack 201 will be driven to the left when rack 207 is driven to the right. The purpose of this double rack drive is to counterbalance the shock created by each air cylinder piston upon completing a stroke. If only one rack were used, the shock created by its piston upon completing a stroke might be of such intensity that the carriage 9 would be bounced or moved in one direction or the other, which uncontrolled carriage movement could adversely affect the operation of the apparatus as will become apparent. The length of the stroke of the racks is such that the shaft 191 is rotated slightly less than 360° during one stroke of the racks. As will be understood, one revolution of shaft 191 will cause the upper shear blade 149 to be moved from a raised position down to cutting position and back to a raised position. At the time of the next shearing operation, the rack 207 will be driven to the left and the rack 201 to the right as viewed in FIG. 7.

Two switches LSL and LSR (FIGS. 5, 6 and 17), the purpose of which will be set forth in the discussion of the control circuit and the operation of the apparatus, are attached to the sides of housing 133 and have arms 225, 227, respectively, adapted to engage cams 193 and 195, respectively. The cams 193 and 195 are so constructed that during one cycle of upper shear blade 149, i.e., movement of shear blade 149 down to cutting position and back to a raised position, switch LSL will be actuated just after the shear blade begins its downward movement and switch LSR will be actuated just before the shear blade reaches its raised position, i.e., just before the end of a cycle. During the next shearing cycle the switches are actuated in a reverse sequence, i.e., switch LSR is actuated just after shear blade 149 begins its downward movement and switch LSR is actuated just before blade 149 reaches its raised position, because the shaft 191 will be driven slightly less than 360° in a reverse direction by racks 201, 207.

A switch LSB (FIGS. 5, 6 and 17), the purpose of which will be subsequently described, is connected to the carriage 9 and has a switch-actuating arm 231 adapted to be actuated by the yoke 185 when the yoke reaches its lowermost position during a shearing cycle, i.e., when the shear blade 149 reaches its lowermost or cutting position.

Another switch 233 (FIGS. 1 and 6), the purpose of which is to stop the operation of the feed rolls as will also be subsequently described, is mounted on an arm 235 (FIGS. 1 and 6) which extends upwardly from carriage 9. Switch 233 includes a switch arm 239 adapted to engage an adjustable cam member 241 (FIG. 1) slidably mounted on the supporting frame 19 when the carriage 9 has moved a predetermined distance to the right as viewed in FIG. 1. This distance is that necessary to cut from strip S a segment having a length which is equal to the desired outside circumference of the core loop after the latter is wound. In other words, assuming for example it is desired to form a core loop having a circumference of 40 inches, the cam member 241 is so positioned on frame 19 that the switch 233 is actuated after a strip segment of 40 inches has been cut from strip S. The feed rolls will then be stopped, thus preventing any further segments being cut from strip S. Therefore, the 40-inch strip segment is the outside or last segment of the core loop.

The carriage 9 (FIGS. 1, 5 and 6), which carries the feed roll assembly 5 and the shear 7, includes two sets of wheels 243, 245 riding on rails 247, 249 (FIGS. 5 and 6) which are secured to frame 19. As stated previously, the carriage 9 (and shear 7) is moved $2\pi t$ to the right as viewed in FIGS. 1, 2 and 3 between each shearing operation.

The carriage moving bands 11 (FIGS. 1, 2, 3, 5, 8 and 9) are provided to accomplish the above described movement of carriage 9. These bands are preferably constituted by a length of flexible steel tape or by bands the ends of which are attached as illustrated at 251 to the left end of the supporting frame 19 as viewed in FIGS. 1, 2 and 3. The bands 11 are trained around sliding roll SR on opposite sides of wrapping belt 3, around rolls 253, 255 and 257 (rotatably attached to frame 19), operatively connected to the carriage 9 as will be subsequently described, and then trained around an air cylinder biased roll 259 connected to the piston rod of an air cylinder AC. The other ends of the bands 11 are attached at 261 to frame 19. With this arrangement it will be seen that a certain increase in the length of the portion X of belt 3 causes the remaining portion of the belt to be decreased a like amount. Accordingly, the sliding roll SR is moved to the right in FIGS. 1, 2 and 3 one-half the amount of decrease in the remaining portion of belt 3. A certain amount of movement of sliding roll SR to the right as viewed in FIG. 1 will cause a reference point P (to the right of carriage 9 in FIGS. 1, 2 and 3) on bands 11 to move to the right exactly twice as much as roll SR due to bands 11 being trained around roll SR and being connected to frame 19 at 251. Thus, the point P moves to the right exactly the same amount as the increase in the length of portion X of belt 3. It will be noted that this relationship in movement between point P and the increase in portion X is maintained regardless of the relative diameters of the portions of roll SR around which the belt 3 and bands 11 are trained. The air cylinder biased roll 259 (which is biased to the left in FIGS. 1, 2 and 3 by the air cylinder AC) will be pulled to the right the same amount as sliding roll SR moves to the right.

As mentioned previously, the specific arrangement of the endless wrapping belt 3 and the rolls 31, 33, 35, 37, 39 and SR as illustrated herein is such that as one segment is being wound on the core form 1 the sliding roll SR is pulled to the right as viewed in FIG. 1 by an amount slightly different than is necessary to obtain precisely a $2\pi t$ movement of carriage 9 and shear 7. Accordingly, if the bands 11 were connected directly, i.e., fixed, to carriage 9, the latter and shear 7 would be moved slightly too far to the right as viewed in FIG. 1 to cut a segment having an increase in length of only $2\pi t$ over the length of the previously cut segment. One convenient way to correct or compensate for this is to connect bands 11 to carriage 9 in such a manner that the carriage does not move as far to the right (FIG. 1) as point P, during each cycle of operation. This is accomplished by adjusting mechanism AM which includes a cross clamp 263 (FIGS. 1 and 8) extending between bands 11 beneath carriage 9. A rack 265 (FIGS. 5, 8 and 9) is secured in clamp 263 and extends toward roll 257 (FIG. 1). This rack is slidably received in a U-shaped guide 267 (FIGS. 5 and 8) rigidly attached to carriage 9. A spring 269 (FIGS. 1, 5 and 9) pulls clamp 263 toward the guide 267.

Rack 265 is in mesh with a gear 271 (FIGS. 5 and 8) having a shaft 273 rotatably journalled in one leg of guide 267 and a bearing 275 mounted on the right edge of carriage 9 as viewed in FIG. 5. Rigidly attached on the outer end of shaft 273 is an arm 277 (FIGS. 5, 8 and 9) having a roller 279 mounted on the outer end thereof. The roller 279 engages an adjustable elongate cam 281 (FIGS. 5, 8 and 9) mounted on supporting frame 19. As the point P on bands 11 is pulled to the left as viewed in FIG. 9 (to the right as viewed in FIG. 1), the rack 265 will be pulled to the left the same amount. If the elongate cam 281 were exactly horizontal (rather than inclined downwardly) the arm 277 could not rotate clockwise as viewed in FIG. 9. Thus the rack 265, gear 271 and carriage 9 would be moved the same amount as point P on bands 11. However, since cam 281 is inclined downwardly to the left as viewed in FIG. 9, the arm 277 is permitted to rotate a slight amount in a clockwise direction as the carriage 9 moves away from core form 1. Thus when the point P on bands 11 is moved a certain distance to the left as viewed in FIG. 9, the gear 271, while being moved to the left most of this distance, will crawl a small amount to the right relative to the rack 265 as a result of the arm moving in a clockwise (as viewed in FIG. 9) direction a small amount. Therefore, the gear 271 and consequently the carriage 9 will not move away from the core form 1 as much as the point P on bands 11. By adjusting the inclination of elongate cam 281, the carriage may be made to move $2\pi t$ to the right as viewed in FIG. 1, although point P on bands 11 may move more than $2\pi t$ during each period between successive actuations of the cutter. It will be recalled that the carriage movement is dependent on the thickness $t$ of strip S. Thus, variations in the thickness $t$ of strip S are automatically compensated for by this apparatus.

The strip segment hold-down and feed belt 13 (FIG. 1) frictionally engages and holds down the strip S while the latter is fed toward stop 15 on a double-rail table 282 (FIGS. 1, 10 and 11) connected to carriage 9 between trip mechanism 17 and shear 7. Belt 13, which also functions to feed successive strip segments into the nip of the core form 1 and wrapping belt 3, is trained around rollers 283, 285, 287 and 289 (FIG. 1) which are mounted on supporting frame 19, and rollers 291 and 293 mounted on the arm 235 which extends upwardly from carriage 9. The belt is driven by roller 285 which is driven through a belt and gear connection 295 (FIG. 12) by motor-driven shaft 51. Belt 13 merely slides over the strip segment positioned therebeneath until the trip mechanism 17 kicks the leading end of the segment upwardly, at which time the belt forces the segment into the nip of the core form 1 and wrapping belt 3.

Figure 11:
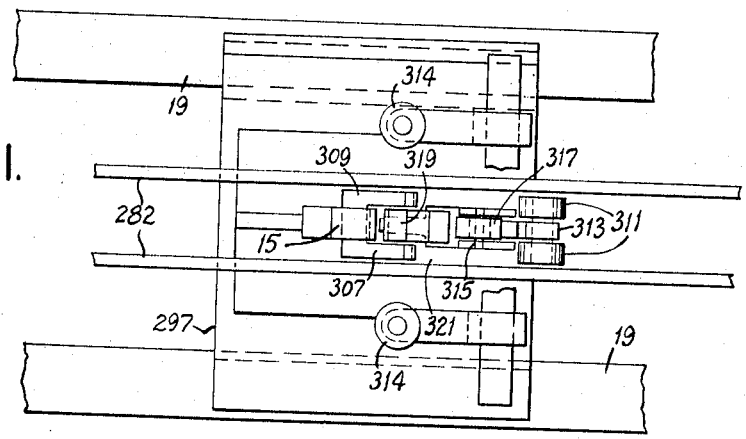
FIG. 11 is a plan view of FIG. 10, with parts removed.
Figure 10:
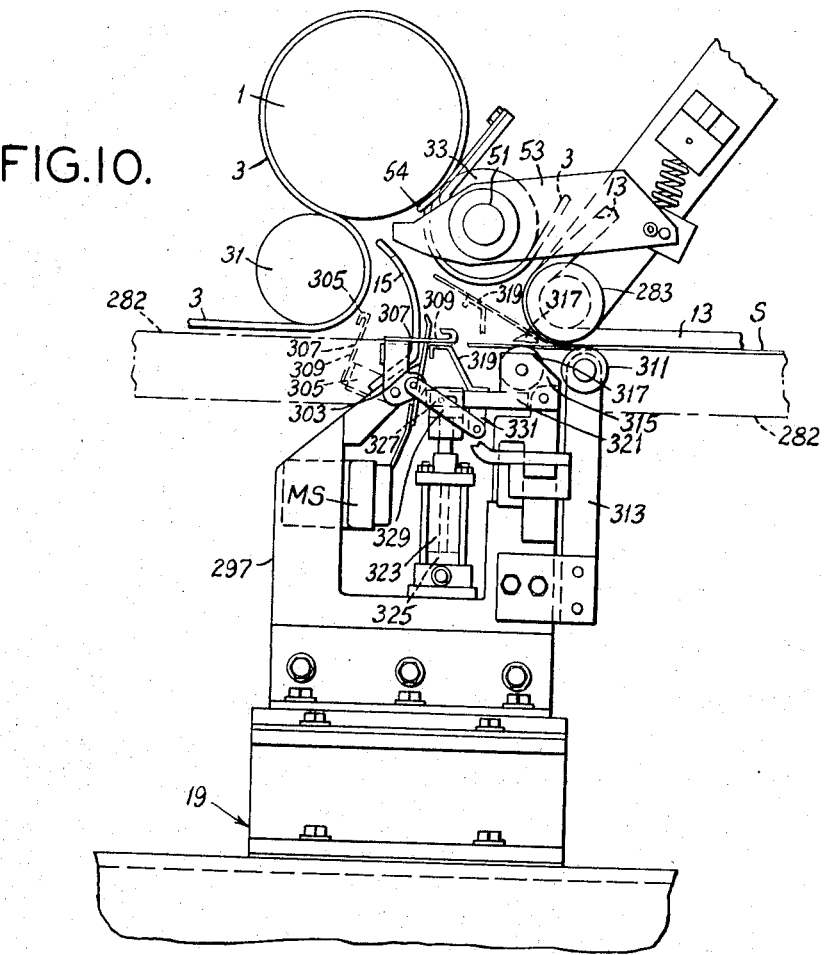
FIG. 10 is an enlarged fragmentary front elevation of a trip mechanism of the apparatus, with parts broken away.

The stop 15 and trip mechanism 17, which stop and kick, respectively, the leading end of each of the strip segments upwardly toward the nip of the core form 1 and wrapping belt 3 at the proper time to obtain the desired offset between the joints of adjacent segments, are shown on an enlarged scale in FIGS. 10 and 11. The stop 15 is mounted on one leg (the left-hand leg as viewed in FIG. 10) of a composite U-shaped base 297 and extends upwardly across the path of the strip S. The strip S will be fed toward the stop 15 by the feed rolls 55 and 57 (FIG. 1) until the forward end of the strip abuts stop 15. As the feed rolls continue to feed strip S, hump HP will be formed by the strip between the feed roll assembly 5 and the shear 7 (see FIG. 2). The formation of the hump HP is aided by the hold-down roller 159 (FIGS. 1 and 6). This hump will actuate switch SFR which causes clutch and brake assembly 91 (FIG. 12) to stop the feed rolls 55, 57. As the leading end of strip S abuts stop 15 it also actuates a switch MS by engaging and moving to the left (as viewed in FIG. 10) a switch arm 303. The purpose of this switch MS is to indicate that the steel strip S has reached the stop 15 as described hereinafter.

Pivoted on the upper end of the left-hand leg of base 297 as viewed in FIG. 10 is a finger support 305 having holding fingers 307, 309 thereon. The support 305 and fingers 307, 309 are movable between a holding position (solid-line position in FIG. 10), wherein the fingers are positioned over the leading end of a strip S and aid the hold-down belt 13 in holding the strip down on table 282 while shearing takes place, and a retracted position (dotted-line position in FIG. 10), wherein the fingers 307, 309 are out of the path of the strip S. The pivotal movement is accomplished in a manner to be described subsequently.

A first pair of rollers 311 is attached to the right-hand leg of base 297 by a roller mount 313. Rollers 311 are adapted to engage the lower surface of strip S to press the latter against hold-down belt 13. A second pair of rollers 314 (FIG. 11), mounted on the right-hand leg of base 297, is adapted to engage the side edges of strip S to prevent lateral movement thereof.

Pivotally attached to the upper end of the right-hand leg of base 297 as viewed in FIG. 10 is a roller support 315 in which is mounted a pinching roller 317. A tripping finger 319 extends upwardly from an arm 321 of roller support 315 to a position just below the leading end of strip S when the latter abuts stop 15. The roller support 315 is adapted to be moved from a retracted position solid-line position in FIG. 10) wherein the tripping finger 319 and roller 317 are below the path of strip S to a tripping position wherein the tripping finger kicks the leading end of a segment of strip S upwardly and roller 317 pinches the strip segment against belt 13 to feed the segment under U-shaped restraining arm 53 into the nip of core form 1 and the wrapping belt 3.

The holding fingers 307, 309, the tripping finger 319, and the pinching roller 317 are adapted to be moved from their solid-line positions in FIG. 10 to their dotted-line positions by an air operated trip cylinder 323 having a piston 325.

Piston 325 is biased downwardly by a spring (not shown) and is adapted to be moved upwardly when air is supplied to the lower end of cylinder 323. As will be described hereinafter, after the shear 7 has cut a segment from strip S, air is supplied to cylinder 323 from an air source (not shown) upon energization of a solenoid valve AVT (shown in FIG. 17 only). The upper end of piston 325 is attached by a pin and slot connection 327 to arm 321 of roller support 315. A link 329 connects holding finger support 305 to a projection 331 extending downwardly from arm 321 so that the holding finger support 305 and roller support 315 will pivot in opposite directions at the same time. It will thus be seen that upward movement of piston 325 causes the roller support 315 and the holding finger support 305 to pivot clockwise and counterclockwise, respectively, as viewed in FIG. 10, thereby causing the holding fingers 307, 309, the tripping finger 319, and the pinching roller 317 to be moved to their dotted-line positions. This causes the leading end of a segment of strip S to be kicked upwardly toward and fed into the nip of the core form 1 and wrapping belt 3.

The timing apparatus TA for controlling the operation of the shear 7 and trip mechanism 17 is shown in FIGS. 12–16. The timing apparatus is so constructed that the shear is operated to cut each segment from strip S and the tripping mechanism is operated to kick each segment upwardly at the proper time in order to wind a core loop having the abutting ends of each segment offset from the abutting ends of the preceding segment by the desired distance. This apparatus essentially includes a commutator disc or plate 337 (FIG. 12) having a plurality of curved or arcuate-shaped electrically conductive segments 339–1 through 339–20 (FIGS. 12 and 17) fixed on the outer face thereof, and a brush carrying plate 341 having a shear operating brush BS, a trip mechanism operating brush BT and an end-of-cycle brush BE connected thereto (FIGS. 12, 13, 14 and 16), the brush plate being adapted to move spirally outwardly as the core form rotates and the core loop being wrapped increases in outside diameter. As will hereinafter be made apparent the brushes BS, BT and BE carried by brush plate 341 must rotate at the same rate as the core form 1 and also move outwardly in a radial direction from the center of the commutator plate 337 the same amount and at exactly the same rate as the radius of the core loop being wound increases. Thus, as the core loop being wound is built from a core loop having a radius of 2 inches, for example, to a core loop having a radius of 8 inches, for example, the brushes BS, BT and BE in addition to rotating at the same speed as the core form 1 must move outwardly in a radial direction from the center of the commutator plate 337 from 2 inches to 8 inches.

The brush carrying plate 341 and brushes BS, BT and BE are mounted for the above type of movement by the following apparatus:

As will be seen in FIGS. 1 and 13, an arm 343 is connected to sliding plate 25 on the rear side of the apparatus. Commutator plate 337 is connected to the outer end of arm 343 by a bracket 345 (FIG. 13). Thus, as sliding plate 25 and the axis of rotation of the core form 1 move upwardly in response to the increase in build up of the core loop being wound, the arm 343, bracket 345 and commutator plate 337 are also moved upwardly at the same rate as the center of the core form 1.

Mounted within the outer end of arm 343 is a bearing 347 (see FIG. 14) in the center of which another bearing 349 is rotatably mounted. The inner race of bearing 349 is secured to a tubular shaft 351 which extends outwardly (to the left as viewed in FIG. 14) through a bearing 353 in bracket 345 and a hole 355 in commutator plate 337. An arm 357 is attached to tubular shaft 351 to the left of the commutator plate as view in FIG. 14 and carries a brush guide track 359 (see FIG. 16) thereon. The purpose of track 359 will be later explained. Mounted on tubular shaft 351 adjacent arm 357 is a rack support 361 (FIGS. 14 and 16) in which two racks 363, 365 are slidably mounted. As will be described hereinafter, the lengthwise movement of racks 363, 365 is under control of a pair of gears 367 (FIGS. 13 and 14). The racks 363, 365 are tied together at one end thereof by brush carrying plate 341 (see FIG. 16). The brushes BS, BT and BE (see FIG. 14), brush plate 341, racks 363, 365, gears 367, rack support 361, arm 357, guide track 359 and tubular shaft 351 will therefore rotate together. The shaft 51, and therefore brushes BS, BT and BE, are adapted to be rotated at the same speed as core form 1 by a belt 369 (FIGS. 13, 14 and 15) trained around a pulley 371 on shaft 351 and around a pulley 362 (FIG. 13) of the same diameter as pulley 371 on the core form shaft 21.

Referring now to FIG. 14, it will be seen that another rack support 374 is mounted between the inner race of bearing 347 and the outer race of bearing 349. Two racks 375, 377 (FIGS. 14 and 15) are slidably mounted in support 374 and are tied together at their lower ends by a clamp 379 pivotally connected to the supporting frame 19. A shaft 381 (FIG. 15) is rotatably mounted in ears 383, 385 extending away from rack support 374. The shaft 381 is provided with three gears 387, 389 and 391. Gear 387 extends through an opening (not shown) in rack support 374 and meshes with rack 375. Gear 389 extends through another opening (not shown) in rack support 374 and meshes with rack 377. Gear 391 extends through an opening 392 (FIG. 14) in a tubular member 393 secured at one end within the rack support 374. With this arrangement of parts, upward movement of sliding plate 25 (FIG. 1) as a result of the increase in build of the core loop being wound will cause the arm 343, bearing 347, rack support 374, ears 383, 385, shaft 381, gears 387, 389, 391 and tubular member 393 to move upwardly at the same rate as plate 25. Since racks 375, 371 are held against upward movement by the pivotal clamp 379, the racks will cause gears 387, 389, and consequently shaft 381 and gear 391, to rotate in a counterclockwise direction as viewed in FIG. 14.

Gear 391 is in mesh with a rack 395 slidably mounted within tubular member 393. As the gear 391 is rotated counterclockwise as viewed in FIG. 14, rack 395 will move to the right. A thrust bearing 397 having a rotatable center portion 399 is attached to the left end of rack 395 (FIG. 14). The rotatable center portion 399 is keyed as indicated at 401 to a rack holder 403 slidably connected to the interior of tubular shaft 351. A rack 405 is held within holder 403. Thus, upon movement of rack 395 to the right as viewed in FIG. 14, the rack 405 will be pulled to the right by rack holder 403 and thrust bearing 397, even though rack 405 and rack holder 403 are rotating with tubular shaft 351.

Rack 405 drives a gear 407 (similar to gear 391 in FIG. 14) extending through an opening 409 (FIGS. 14 and 16) in tubular shaft 351. Gear 407 is attached to a shaft 411 mounted in ears 413, 415 (see FIG. 16) on rack support 361. Also mounted on shaft 411 is the pair of gears 367 (only one of which is shown in FIG. 14 but which are similar to gears 387, 389) which extend through openings 419, 421 (FIG. 16) in rack support 361 into meshing engagement with racks 363, 365. It will therefore be seen in FIG. 14 that movement of rack 405 to the right as viewed therein will cause the brushes BS, BT and BE to move downwardly as viewed in FIG. 14, i.e., outwardly from the center of the commutator plate 337 in a radial direction.

Figure 16:
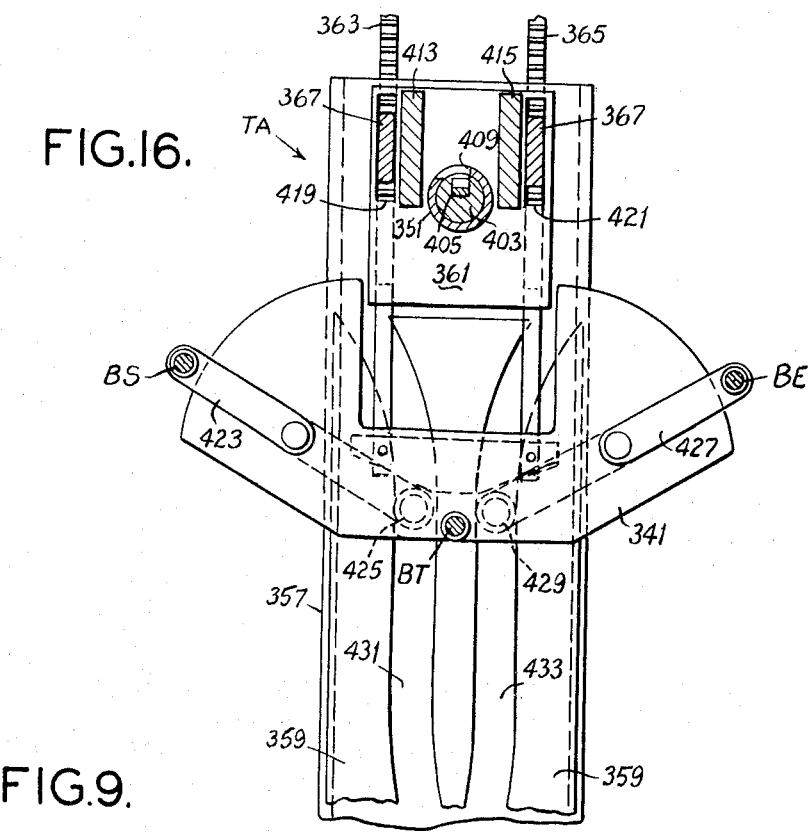
FIG. 16 is a section taken on line 16—16 of FIG. 14, showing certain parts not appearing in FIG. 14 and with other parts broken away and removed.
Figure 9:
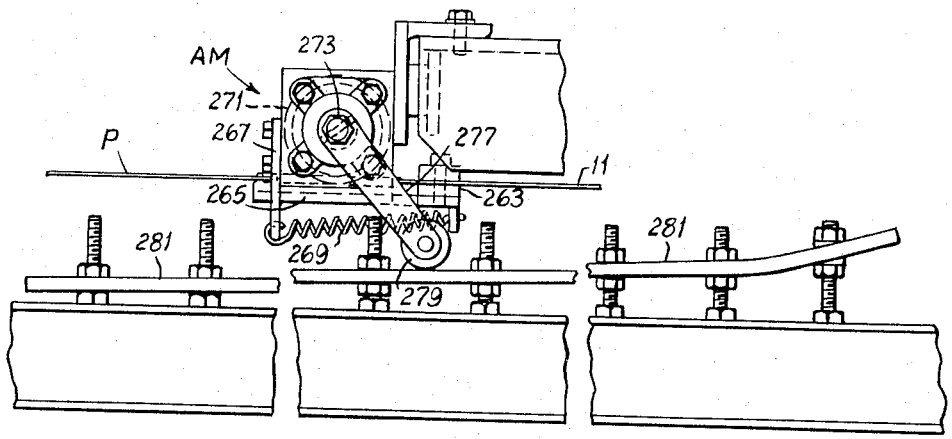
FIG. 9 is a fragmentary rear elevation of a portion of the apparatus, looking from line 9—9 of FIG. 5, with parts broken away and removed.

In order to insure that each of the brushes BS, BT and BE is moved radially outwardly exactly the same amount, the brush BS is connected to brush carrying plate 341 by a bell crank 423 (FIG. 16). Brush BS is mounted on the outer end of one arm of bell crank 423 and a follower 425 is mounted on the outer end of the other arm of the bell crank. Brush BE is connected to plate 341 by a bell crank 427 in the same manner as brush BS, i.e., brush BE is on the outer end of one arm of bell crank 427 and a follower 429 is on the outer end of the other arm of the bell crank. Followers 425 and 429 respectively ride in grooves 431 and 433 in brush guide track 359. The grooves are so arranged that while the brush carrying plate 341 is moving downwardly as viewed in FIG. 16, the brushes BS and BE are maintained at exactly the same distance from the center of tubular shaft 351 as the brush BT, which is fixed to brush carrying plate 341.

With the above described arrangement of parts it will be seen that as the core loop being wound increases in diameter, the brushes BS, BT and BE will rotate around the center of the commutator plate 337 at the same speed that the core loop is rotating, and also move outwardly of the center of the commutator plate 337 in a radial direction at the same rate that the radius of the core loop increases. The complete timing assembly TA moves upwardly at the same rate as the axis of rotation of the core form 1. Thus, the movements of the various parts of the timing apparatus TA are proportional to the movements of certain elements of the core form 1 and the core loop being wound.

Referring now to the commutator plate 337 (FIG. 12) construction per se, it will be recalled that a plurality of curved electrically conductive segments 339–1 through 339–20 are provided on the outer surface thereof. Any number of such segments may be provided and in the embodiment discussed hereinafter only segments 339–1 through 339–18 are connected into the control circuit. Each of these segments is electrically connected by a different conductor to a respective contact of a stepping switch W1 (shown in FIG. 17 only) which constitutes one portion or deck of a three-deck assembly that also includes stepping switches W2 and W3. Thus, conductive segment 339–1 is connected to contact number 1 of W1, segment 339–2 to contact number 2, and so on. Switch W1 has a movable arm or rotor 436 which selectively connects commutator segments 339–1 through 339–18 to terminal 437 in the control circuit of FIG. 17. Arm 436 is stepped or advanced from one contact of switch W1 to the adjacent contact by a coil MM within a stepping relay 438.

Brushes BS, BT and BE are connected in the control circuit by wires 439, 440 and 441, and a conventional slip ring assembly 443 (FIGS. 12, 13, 14 and 17). As will hereinafter become apparent, when brush BS contacts conductive segment 339–7 (assuming, for example, that this is the conductive segment initially connected to point 437 by switch W1) the shear 7 will be operated to cut the first strip segment S–1 from strip S; when brush BT contacts conductive segment 339–7 the trip mechanism 17 kicks the leading end of the first strip segment upwardly toward the nip of core form 1 and wrapping belt 3; and when brush BE contacts conductive segment 339–7 various relays in the control circuit are actuated along with coil MM which steps arm 436 connecting a second conductive segment 339–8 into the control circuit at point 437. When brushes BS and BT then contact conductive segment 339–8 the second strip segment is cut and kicked upwardly, respectively; and when brush BE contacts conductive segment 339–8 coil MM is again actuated, stepping arm 436 to connect conductive segment 339–9 to point 437. The above sequences are repeated for succeeding conductive segments for the number of times necessary to obtain a core loop packet having the desired number of strip segments therein. The control circuit then causes arm 436 to connect the originally connected conductive segment (such as 339–7) to point 437 and the packet cycle is repeated. For example, if it is desired to make a core loop having two concentric packets with six segments in each packet as shown in FIG. 4, switch W1 will progressively connect conductive segments 339–7 through 339–12 to point 437. After six segments have been wound on the core form, the control circuit will be effective to cause arm 436 to again connect conductive segment 339–7 into the control to the circuit of point 437 to initiate the building of the second packet P–2. After the last segment of the second packet P–2 is cut from strip S, the switch 233 (FIG. 1) is actuated by the engagement of its arm 239 with cam 241 and deactuates the clutch and brake assembly 91 (FIG. 12), thereby preventing further feeding of strip S by stopping feed rolls 55 and 57. Clutch 43 (FIG. 12) is disengaged by a manually operated switch (not shown) to stop the rotation of the core form and the core loop is removed in a manner to be subsequently described.

The arrangement of conductive segments 339–1 through 339–18 is such that the distance traveled by any one of the brushes BS, BT or BE as each moves spirally around the commutator plate 337 in a counterclockwise direction as view in FIG. 12 between first contacting one conductive segment and first contacting a succeeding conductive segment is equal to the distance that the brushes would travel during one complete revolution minus the desired offset between the abutting ends of the one strip segment and the abutting ends of the succeeding strip segment of the core loop shown in FIG. 4. For example, if an offset of five-eighths of one inch were desired between abutting ends of one strip segment and the abutting ends of the succeeding strip segment, the distance that the brushes would travel between first contacting one conductive segment, for example segment 339–1, and first contacting a succeeding conductive segment, such as segment 339–2, would be the distance that the brushes would travel during one complete revolution minus five-eighths of one inch. This five-eighths of one inch distance is represented by dotted line A–B in FIG. 12. This five-eighths of one inch separation remains constant even though the brushes move radially outwardly from the center of the commutator plate, i.e., the line A–B represents the distance that the brushes do not have to travel to contact segment 339–2 when the brushes are relatively close to the center of the commutator plate, and the line A–B1 represents the distance that the brushes do not have to travel to contact segment 339–2 when the brushes are farther away from the center of the commutator plate, such as when the second packet of strip segments is to be initiated. Lines A–B and A–B1 are equal in length. This same relationship exists between each segment and the succeeding segment throughout the lengths of the segments. It will be understood that by changing the shape and size of the conductive segments 339–1 through 339–20 other types and configurations of core loops can be produced by this apparatus.

The control circuit illustrated schematically in FIG. 17 will now be considered. In FIG. 17 clockwise rotation of the brushes BS, BT and BE corresponds to counterclockwise rotation as viewed in FIG. 12. In addition to stepping switches W1, W2 and W3, commutator segments 339–1 to 339–18, brushes BS, BT and BE and the associated slip ring assembly 443, the circuit of FIG. 17 includes a plurality of relays E, H, R, SC, T and U, the switches MS, LSB, LSL and LSR, the air solenoid valve AVT, and the pair of solenoid pilot valves PAV–R and PAV–L. Each relay includes one or more sets of contacts which are shown bearing like reference designations. Thus, relay E includes contacts E1, E2 and E3; relay H includes contacts H1, H2 and H3; and so on. A pair of conductors L1 and L2 connected to a source of A.C. power (not shown) is provided. Line L2 is grounded. A conventional halfwave rectifier 445 having an input circuit connected across line L1 and L2 is also provided. The D.C. output of this rectifier is applied across a conductor L3 and grounded line L2.

As illustrated in FIG. 10 and explained above, switch MS is closed as the leading end of a strip S of magnetic material abuts stop 15. Thereafter, assuming for example that the stepping switch W1 connects conductive segment 339–7 to point 437, and further assuming that the contacts of switches LSL and LSR are initially positioned as shown (the movable contact of LSL engaging its terminals 1, 4 and the movable contact of LSR engaging its terminals 2, 3) when brush BS contacts conductive segment 339–7, a circuit is completed energizing solenoid pilot valve PAV–R. This circuit may be traced from conductor L1, through solenoid PAV–R, terminals 2, 3 of switch LSR, normally closed contacts SC3, switch MS, slip ring assembly 443, brush BS which contacts segment 339–7, stepping switch W1, point 437, and the normally closed contacts H1 to line L2. The energizing of PAV–R causes air to enter air cylinders 205 and 211 of the driving mechanism thereby operating shear 7. As this shear begins its downward stroke, cam 195 (FIG. 6) rotates causing the movable contact or arm of switch LSR to be moved from terminals 2, 3 into engagement with terminals 1, 4. A circuit is thereby completed energizing relay SC. This circuit may be traced from line L1 through normally closed contacts E2, relay coil SC, terminals 1, 4 of switch LSR, terminals 1, 4 of switch LSL, to conductor L2. Normally opened contacts SC1 close forming a holding circuit for relay SC; normally closed contacts SC3 open, preventing the shear from being reenergized until relay SC has been deenergized; and normally opened contacts SC2 close. When the shear nears the bottom of its stroke, switch LSB (FIG. 6) closes, energizing relay coil R. This closes normally opened contacts R1, sealing in relay R. Contacts R2 also close. As the shear 7 is about to complete its upward stroke, cam 193 (FIGS. 5 and 6) causes the movable contact of switch LSL to engage its contacts 2, 3. As brush BT contacts segment 339–7, which is grounded through contacts H1, a circuit is made energizing both the air valve solenoid AVT and relay T. This circuit may be traced from line L1 through both air valve solenoid AVT and the coil of relay T, contacts R2, SC2, which are now closed, and contacts U1, which are normally closed, the slip ring assembly 443, brush BT which is now in engagement with conductive segment 339–7, arm 436 of switch W1, and contacts H1 to line L2. The energizing of solenoid AVT supplies air to the trip operating cylinder 323 (FIG. 10) causing the leading end of the strip segment S–1 to be kicked upwardly and fed by feed belt 13 (FIGS. 1, 2, and 3) into the nip of core form 1 and wrapping belt 3. Upon the energizing of relay T contacts T1 and T2 close, sealing in relay T through normally closed contacts E1 and contacts R2 and SC2 which are now closed. Contacts T3 also closed. The closing of contacts T1 energizes coil MM of stepping relay 438. This advances a plunger (not shown) which, when coil MM is subsequently deenergized, will cause the movable arms of switches W1, W2 and W3 to advance one position. The closing of contacts T3 places the coil of relay U across lines L2 and L3, energizing this relay and thereby opening contacts U1 and closing contacts U2. Thereafter when brush BE contacts the segment 339–7 of the commutator 339, a circuit is made through now closed contacts U2, energizing the coil of relay E and opening contacts E1. This deenergizes both relay T and the solenoid AVT. Contacts E2 are reopened, deenergizing relay SC, and contacts E3 are opened, deenergizing relay R. Contacts T1 also open deenergizing coil MM of the stepping relay, causing arm 436 of stepping switch W1 to advance one position to connect conductive segment 339–8 to point 437. The movable arms of switches W2 and W3 are concurrently advanced one position to their respective contacts number 3. At this point all of the relays and solenoid valves have been deenergized and the control circuit is ready to begin another cycle of operation.

The brush assembly continues to rotate (clockwise in FIG. 17, counterclockwise as viewed in FIG. 12). The leading edge of a second strip of magnetic material abuts stop 15, closing switch MS. Since contacts 1, 4 of switch LSR and contacts 2, 3 of switch LSL are closed at the beginning of this sequence, solenoid pilot valve PAV-L (instead of PAV-R as before) is energized as brush BS contacts segment 339-8. Except for this, the sequence of operation during this second cycle is the same as that described above. At the end of this second cycle, the movable contacts of LSL and LSR are again positioned as shown in FIG. 17 and conductive segment 339-9 is connected to point 437 by switch W1. During the next succeeding cycle solenoid pilot valve PAV-R is energized by the control circuit. This operation continues with solenoid pilot valves PAV-R and PAV-L being alternately and successively energized until a desired number of segments of magnetic material have been wound on the core, forming one packet.

A selector switch 447 (FIGS. 1 and 17) is provided to facilitate automatic control of the number of such segments, i.e., the number of segments per packet. This switch has a portion A (FIG. 17) constituted by a rotor or movable contact 449 associated with a plurality of terminals 11-18, and a portion B constituted by a rotor or a movable contact 451 associated with a plurality of terminals 1-8. Terminals 1-8 of switch 447 are connected respectively to terminals 1-8 of deck W3, and terminals 11-18 of switch 447 are connected respectively to terminals 11-18 of deck W2. The stepped arms or rotors of decks W2 and W3 are ganged with arm 436 of deck W1, and the terminals or contacts of W2 and W3 correspond to the terminals or contacts of W1. That is, when arm 436 of W1 is in engagement with its terminal number 1, the arms of W2 and W3 are each in engagement with their respective number 1 terminals. Contacts 9-18 of W3 are connected to ground. Rotors 449 and 451 are movable on the same shaft 453 which may be manually positioned in accordance with the number of segments which are to constitute one packet. Both of these rotors are connected to ground.

Rotor 449 has a finger or brush 455 which selectively engages one of its contacts. The position of this finger determines which of terminals 11-18 of stepping switch W2 is connected to ground. Rotor 451 has a cutout or indent 457 selectively positioned with respect to contacts 1-8. Rotor 451 connects all of terminals 1-8 of stepping switch W3 to ground except that terminal which corresponds to the contact opposite indent 457. The position of indent 457 determines the starting or home position and number of the first segment of each packet. Thus, when indent 457 is opposite contact number 7, for example, the first segment of each packet will be wound when brush BS contacts conductive segment 339-7. The position of brush 455, on the other hand, determines the stopping position or number of the last segment of each packet. Thus, if brush 455 is in engagement with contact 13, segments of magnetic material will be wound on the core for each contact 7, 8, . . . of stepping switches W1, W2 and W3 until the arms of these stepping switches are advanced to their respective terminals number 13. When this terminal 13 is engaged, the control circuit causes stepping relay 438 to step or advance the arms of W1, W2 and W3 from contact to contact until they are again in engagement with their respective terminals number 7. At this point the arms come to rest and a segment of strip S is cut and wound on the core under the control of conductive segment 339-7, thus beginning a new packet. Thereafter strip segments are wound for each of segments 339-8, 339-9, . . . 339-12. When the arms of stepping switches W1, W2 and W3 again contact terminals number 13, they are again rotated or advanced from terminal to terminal until they again come into engagement with terminal number 7 to begin the winding of a third packet. This sequence continues until a core of desired dimensions is formed.

Selector switch 447 permits any number of segments per packet to be selected. If this switch is positioned as shown in FIG. 17 there will be six segments per packet, one each for positions 7, 8, 9, 10, 11 and 12. Seven segments per packet would be wound if rotors 449 and 451 were rotated one position clockwise from that shown in FIG. 17, and five segments per packet would be wound upon rotation of these rotors one poistion counterclockwise from that shown in FIG. 17.

Selector switch 447 functions to control the number of segments per packet in the following manner. Assuming the switch to be set as shown, and further assuming that the segment or strip of core material corresponding to position number 12 is being wound on the packet, at the end of this winding sequence relay 438 steps each of the arms of W1, W2 and W3 into engagement with its respective contact number 13. As the arm of W2 contacts terminal number 13, a circuit is completed which energizes relay H. This circuit may be traced from line L3, through the coil of relay H, the arm of W2 to contact number 13, and through rotor 449 to ground. Normally opened contacts H2 and H3 close and normally closed contacts H1 open. The opening of contacts H1 disconnects point 437 from line L2, thus preventing the operation of that portion of the control circuit shown above line L2 in FIG. 17. The closing of contacts H2 completes a holding circuit for relay H from line L3 through relay H, contacts H2, and stepping switch W3 to ground. The closing of contacts H3 completes a circuit from the positive terminal of a rectifier 459 included within the stepping relay 438, through coil MM, an interrupting contact 461, contacts H3, and the arm of switch W3 to ground. Interrupting contact 461 is controlled by coil MM and is opened when this coil is energized and closed when this coil is deenergized. The energizing of coil MM advances its plunger (not shown) and opens contact 461. This deenergizes coil MM stepping the three arms of stepping switches W1, W2 and W3 to their contacts number 14 and closing contact 461. Coil MM is again energized, opens contact 461, is deenergized, closes contact 461, and again advances the arms of switches W1, W2 and W3, this time to position number 15. The arms of W1, W2 and W3, are advanced from position number 15 to 16, from 16 to 17, from 17 to 18, from 18 to 1, etc., until the arm of W3 is moved into engagement with contact number 7, the ungrounded contact. At this point the circuit from the positive terminal of rectifier 459 to ground is interrupted and the closing of interrupting contact 461 no longer energizes coil MM. The circuit from rectifier 445 through relays H and contacts H2 to ground is also interrupted, deenergizing relay H, and causing contacts H2 and H3 to open and contacts H1 to close. Point 437 is thus connected to line L2 through contacts H1, thereby transferring control of the stepping relay coil MM to the portion of the control circuit shown above line L2. This permits the winding of a segment of strip S for each position 7, 8, 9, 10, 11 and 12 of stepping switch W1. As the arm of W2 is again stepped into engagement with contact number 13, relay H is again energized, and the cycle is repeated. This continues until a core loop of predetermined size is wound, i.e., until a strip segment having a length equal to the desired outer circumference of the core loop is cut by shear 7, at which time switch 233 (FIG. 1) is actuated to stop the operation of feed roll assembly 5. Since the strip S is no longer being fed into the apparatus, no further strip segments will be cut and wound.

As stated previously, the clutch 43 is then disengaged by a manually operated switch (not shown) to stop the rotation of the core form 1, i.e., the drive to the wrapping belt 3 is interrupted. The operator then applies adhesive coated tape, for example, over the joint formed by the abutting ends of the last segment (the outermost segment) of the core loop to prevent such segment and all of the remaining inner segments from springing outwardly after the core loop is removed from the core form 1.

In the embodiment shown in FIG. 1, the core loop is removed in the following manner:

The air cylinder AC is actuated by a conventional control (not shown) to move the roll 259 to the right as viewed in FIG. 3. This relieves the bias exerted on bands 11 by the roll 259. The operator then pushes on the wrapping belt 3 between rollers 37 and 39 toward the core form 1. Pushing on belt 3 in this manner causes the sliding roll SR and consequently the carriage 9 to be moved further to the right as viewed in FIG. 3, but it also produces slack in the wrapping belt 3. The operator then lifts the core loop, while it is still on the core form 1, upwardly away from the rollers 31 and 33 and pulls the core loop off of the core form. In order to facilitate the lifting of the core loop and core form away from rollers 31, 33, the sliding plate 25 (FIG. 1) may be counterbalanced by a conventional counterbalancing mechanism (not shown). It will be understood that any suitable apparratus could be provided which would automatically raise the core loop and core form 1 and move them outwardly of the wrapping belt 3 to further facilitate the removal of the core loop.

If the round form of the core loop is satisfactory, the next step is to anneal the core. If a core shape other than round is desired, the round core may be formed to the desired shape (for example, a rectangular shape) and then annealed. In assembling a core with a preformed conductive transformer winding, preferably one or more packets of strip segments are taken out one at a time from the inside of the core, i.e., P–1 first, P–2 second, etc. Each packet or group of packets is sprung open to allow it to be passed through the window of the conductive winding and after it has been passed through the winding it is allowed to spring back to its annealed position. As the packets are assembled one outside another, care is taken to see that the joints are properly fitted. It is also frequently desirable, particularly in reassembling the last or outermost packet of segments around a preformed coil, to remove one or more strip segments from a packet and reassemble them sequentially around the preformed coil. When the assembly is complete, a thin steel strap or band may be applied around the core to hold the core in firmly assembled relationship, or the outer segment may be tack welded at its joint.

To replace the carriage 9 in its initial position (FIG. 2) for the next core loop building operation, the air cylinder AC is actuated to pull the roll 259 and consequently carriage 9 to the left as viewed in FIG. 3 to their FIG. 2 positions.

The switch 447 is set to produce the desired number of strip segments per packet as described above (assuming it is desired to change the number of segments per packet of the next core loop) and the clutch 43 is actuated to start the various driving belts, gears and chains in operation, thus initiating the building of another core loop.

If it is desired to make a core loop in which the joints of one packet are offset from the joints of the segments of the preceding packet by a desired amount, say, 180° for example, it will be understood that such offsetting may be simply accomplished. For example, a dog clutch may be provided in the drive between the shaft 21 and the tubular shaft 351 (FIGS. 13 and 14), which dog clutch could be actuated to rotate the shaft 21 (and consequently brushes BS, BT and BE) 180° after any one packet or each packet of strip segments had been wound. This would result in a core loop having the joints of the segments of any one packet or each packet offset from the joints of the segments of the preceding and succeeding packets by 180°. Another example for accomplishing the same results would be to provide a second set of brushes BS, BT and BE on a second brush plate located the desired amount, 180° for example, out of phase with the first set of brushes BS, BT and BE and brush carrying plate 341. The second set of brushes would be alternately connected in the control circuit at the time or times it would be desired to wind a packet having the segment joints thereof offset from the segment joints of other packets. Still another example of accomplishing the same result would be to provide a second set of conductive segments on the commutator plate the desired amount, 180° for example, from the corresponding conductive segments 339–1 to 339–20. The second set of conductive segments would be alternately connected in the control circuit (and the segments 339–1 to 339–20 would be disconnected) when it is desired to wind a packet having the segment joints thereof offset from the segment joints of other packets. Thus, the joints in all of the packets of a core formed in accordance with this invention may conveniently be caused to fall in any particular desired area, such as one of the legs of a rectangular core or alternate legs, or in one yoke portion, etc.

While the shear 7 is shown as being operated by a double rack mechanism, it will be understood that other shear operating mechanisms may be utilized with equal effectiveness. Ror example, a solenoid operated shear having a blade adapted to move upwardly from the lower side of the strip S to cut a segment therefrom could be used. Moreover, while the apparatus disclosed herein is shown as being adapted for fabricating or building core loops having concentric segments with offset abutting joints, it will be apparent to those skilled in this art that by changing various feaures of the apparatus, such as the shape and size of the conductive segments 339–1 to 339–20, other types of core loops, such as core loops in which the segments thereof have lapped and/or radially aligned joints could be made.

While the core form 1 is shown herein as being circular, it will be understood that core forms other than circular, such as rectangular for example, could be utilized without departing from the spirit of the invention. If a rectangular core form were used, for example, the arrangement of parts (wrapping belt 3, bands 11, etc.) for moving the carriage 9 to the right as viewed in FIGS. 1, 2 and 3 would still function to move the carriage between each shearing operation in such direction by an amount equal to the increase in the perimeter of the core loop being wound. It will also be noted that instead of using a single thickness of strip S for forming strip segments of progressively increasing length, two or more strips, one on top of the other, may be fed into the apparatus and each strip segment will be two or more superposed plies of grain-oriented ribbon, each of identical length.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of forming a core loop comprising feeding a continuous strip of magnetic material toward a rotating core form, intermittently cutting the strip to form individual strip segments, sequentially moving the leading ends of the strip segments toward the core form at predetermined intervals, wrapping each of the segments thus formed on the rotating core form, sensing the increase in the perimeter of the core loop as the segments are wrapped around the core form, and progressively shifting the locus of the cut relative to the core form by a distance proportional to the sensed increase in perimeter to progressively increase the length of the segments cut from the strip.

2. The method of forming a core loop comprising feeding a continuous strip of magnetic material toward a rotating core form, intermittently arresting the feed of the strip with the leading end of the strip positioned adjacent the rotating core form, intermittently cutting the strip to form individual strip segments when said strip is intermittently arrested, progressively shifting the locus of the cut in the direction away from the rotating core from to progressively increase the length of the segments cut from the strip, and engaging and wrapping successively each of the segments thus formed on the rotating core form.

3. The method of forming a core loop comprising feeding a continuous strip of magnetic material toward a rotating core form, arresting the feed of the strip with the leading end of the strip positioned adjacent the core form, intermittently cutting the strip to form individual strip segments, kicking the leading ends of the strip segments toward the core form at predetermined times, progressively shifting the locus of the cut in the direction away from the core form in response to the increase in build of the core loop being wound to progressively increase the length of the segments cut from the strip, and wrapping each of the segments thus formed on the rotating core form.

4. The method of forming a core loop comprising feeding a continuous strip of magnetic material toward a rotating core form, intermittently arresting the feed of the strip with the leading end of the strip positioned adjacent the core form, cutting the strip during the dwell intervals of the strip between successive feeding operations, progressively shifting the locus of the cut in the direction away from the core form in response to the increase in perimeter of the core loop being formed to progressively increase the length of the segments from the strip, and wrapping each of the segments formed on the rotating core form.

5. The method of forming a core loop comprising feeding a continuous strip of magnetic material toward a rotating core form, intermittently cutting the strip to form individual strip segments, progressively shifting the locus of the cut relative to the core form to progressively increase the length of the segments cut from the strip, kicking the leading end of each segment toward the core form at predetermined intervals of rotation of the core form to locate the leading end of each segment in a predetermined position relative to the leading end of the preceding segment, and wrapping each of the segments formed on the core form.

6. The method of forming a core loop comprising feeding a continuous strip of magnetic material toward a rotating core form, intermittently arresting the feed of the strip with the leading end of the strip positioned adjacent the core form, cutting the strip during the dwell intervals of the strip between successive feeding operations to form a series of strip segments, intermittently moving the leading end of each segment toward the core form, sequentially wrapping each of the segments thus formed on the core form, and varying the timing of moving the leading ends of each successive segment to effect a predetermined offset between the leading ends of successive segments.

7. The method as set forth in claim 6 which includes the additional step of further intermittently varying the timing of moving the leading ends of successive strip segments after a predetermined number of strip segments are wound on the core form thereby to form a core loop having at least two packets each with a predetermined number of strip segments.

References Cited

UNITED STATES PATENTS

| | | | |
|---|---|---|---|
| 3,008,222 | 11/1961 | Steinmayer | 29—155.61 |
| 3,049,793 | 8/1962 | Cooper | 29—155.57 |
| 3,093,889 | 6/1963 | Duenke | 29—155.57 |

FOREIGN PATENTS

| | | |
|---|---|---|
| 696,346 | 8/1953 | Great Britain. |

CHARLIE T. MOON, *Primary Examiner.*

R. W. CHURCH, *Assistant Examiner.*